US010093857B2

(12) United States Patent
Hirata et al.

(10) Patent No.: US 10,093,857 B2
(45) Date of Patent: *Oct. 9, 2018

(54) NEMATIC LIQUID CRYSTAL COMPOSITION AND LIQUID CRYSTAL DISPLAY DEVICE USING THE SAME

(71) Applicant: DIC Corporation, Tokyo (JP)

(72) Inventors: Shinichi Hirata, Kita-adachi-gun (JP); Hyobok Cha, Kita-adachi-gun (JP); Naomi Hatano, Kita-adachi-gun (JP); Tomoaki Hara, Kita-adachi-gun (JP); Yasuo Umezu, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 6 days.

This patent is subject to a terminal disclaimer.

(21) Appl. No.: 15/027,646

(22) PCT Filed: Mar. 27, 2014

(86) PCT No.: PCT/JP2014/058812
§ 371 (c)(1),
(2) Date: Apr. 6, 2016

(87) PCT Pub. No.: WO2015/052948
PCT Pub. Date: Apr. 16, 2015

(65) Prior Publication Data
US 2016/0237349 A1    Aug. 18, 2016

(30) Foreign Application Priority Data

Oct. 8, 2013   (JP) .................. 2013-210978

(51) Int. Cl.
| | |
|---|---|
| G02F 1/1333 | (2006.01) |
| C09K 19/32 | (2006.01) |
| C09K 19/12 | (2006.01) |
| C09K 19/20 | (2006.01) |
| C09K 19/30 | (2006.01) |
| C09K 19/02 | (2006.01) |
| C09K 19/04 | (2006.01) |

(52) U.S. Cl.
CPC ........ *C09K 19/322* (2013.01); *C09K 19/0216* (2013.01); *C09K 19/12* (2013.01); *C09K 19/20* (2013.01); *C09K 19/3003* (2013.01); *C09K 19/3028* (2013.01); *C09K 19/3066* (2013.01); C09K 2019/0407 (2013.01); C09K 2019/0448 (2013.01); C09K 2019/122 (2013.01); C09K 2019/123 (2013.01); C09K 2019/301 (2013.01); C09K 2019/3004 (2013.01); C09K 2019/3009 (2013.01); C09K 2019/3016 (2013.01); C09K 2019/3018 (2013.01); C09K 2019/3027 (2013.01); C09K 2019/3036 (2013.01); C09K 2019/3037 (2013.01)

(58) Field of Classification Search
CPC ...... C09K 19/322; C09K 19/12; C09K 19/20; C09K 19/3003; C09K 19/3028; C09K 19/3066; C09K 19/0216; C09K 2019/0407; C09K 2019/0448; C09K 2019/122; C09K 2019/123; C09K 2019/3009; C09K 2019/301; C09K 2019/3016; C09K 2019/3018; C09K 2019/3027; C09K 2019/3036; C09K 2019/3037; C09K 2019/3004

USPC .................................... 252/299.63
See application file for complete search history.

(56) References Cited

U.S. PATENT DOCUMENTS

| | | | |
|---|---|---|---|
| 5,378,274 A | 1/1995 | Yokoyama et al. | |
| 5,599,480 A | 2/1997 | Tarumi et al. | |
| 8,808,814 B2 * | 8/2014 | Matsumura ............ | C09K 19/44 252/299.61 |
| 9,074,132 B2 * | 7/2015 | Gotoh .................... | C09K 19/14 |
| 9,464,231 B2 * | 10/2016 | Ogawa ................... | C09K 19/44 |
| 2008/0191167 A1 | 8/2008 | Klasen-Memmer et al. | |
| 2011/0297881 A1 | 12/2011 | Hirata et al. | |
| 2012/0092608 A1 | 4/2012 | Ito et al. | |
| 2012/0147303 A1 | 6/2012 | Yamada et al. | |
| 2012/0229744 A1 | 9/2012 | Hattori et al. | |
| 2012/0236246 A1 | 9/2012 | Furusato et al. | |
| 2013/0112918 A1 | 5/2013 | Matsumura et al. | |
| 2013/0135575 A1 | 5/2013 | Gotoh et al. | |
| 2013/0222755 A1 | 8/2013 | Furusato et al. | |
| 2015/0309361 A1 | 10/2015 | Kaneoya et al. | |

FOREIGN PATENT DOCUMENTS

| | | |
|---|---|---|
| EP | 0 474 062 A2 | 3/1992 |
| JP | 8-104869 A | 4/1996 |

(Continued)

OTHER PUBLICATIONS

International Search Report dated Jun. 24, 2014, issued in counterpart International Application No. PCT/JP2014/058812 (2 pages).
International Search Report dated Jun. 10, 2014, issued in counterpart International Application No. PCT/JP2014/056464.

*Primary Examiner* — Geraldina Visconti
(74) *Attorney, Agent, or Firm* — Westerman, Hattori, Daniels & Adrian, LLP

(57) ABSTRACT

There is provided a liquid crystal composition having the following properties without reductions in refractive index anisotropy ($\Delta n$) and nematic phase-isotropic liquid phase transition temperature ($T_{ni}$): sufficiently small viscosity ($\eta$), sufficiently small rotational viscosity ($\gamma 1$), a large elastic constant ($K_{33}$), and negative dielectric anisotropy ($\Delta \varepsilon$) with a large absolute value. There is also provided a liquid crystal display device of, for example, a VA type in which such a liquid crystal composition is used and which has a high response speed and excellent display quality with defective display being eliminated or reduced. The liquid crystal display device using the liquid crystal composition of the present invention is useful as an active-matrix liquid crystal display device and can be used in liquid crystal display devices of, for instance, a VA mode and PSVA mode.

12 Claims, No Drawings

(56) References Cited

FOREIGN PATENT DOCUMENTS

| | | |
|---|---|---|
| JP | 2000-019321 A | 1/2000 |
| JP | 2000-192040 A | 7/2000 |
| JP | 2001-354967 A | 12/2001 |
| JP | 2002-309255 A | 10/2002 |
| JP | 2006-37054 A | 2/2006 |
| JP | 2006-301643 A | 11/2006 |
| JP | 2008-144135 A | 6/2008 |
| JP | 2008-208365 A | 9/2008 |
| JP | 2009-109542 A | 5/2009 |
| JP | 2013-096944 A | 5/2013 |
| JP | 5321932 B1 | 10/2013 |
| KR | 10-0286582 B1 | 4/2001 |
| WO | 2010/095506 A1 | 8/2010 |
| WO | 2010/131600 A1 | 11/2010 |
| WO | 2011/055643 A1 | 5/2011 |
| WO | 2011/092973 A1 | 8/2011 |
| WO | 2012/046590 A1 | 4/2012 |
| WO | 2012/066933 A1 | 5/2012 |
| WO | 2012/141069 A1 | 10/2012 |
| WO | 2013/080850 A1 | 6/2013 |

* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition which is useful as a material for a liquid crystal display and which has a negative dielectric anisotropy (Δε), and the present invention also relates to a liquid crystal display device using such a nematic liquid crystal composition.

BACKGROUND ART

Liquid crystal display devices are applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest-host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. Examples of a drive system include static driving, multiplex driving, a passive matrix, and an active matrix (AM) in which, for example, a TFT (thin film transistor) or a TFD (thin film diode) is used for driving.

Among these types of liquid crystal display devices, an IPS type, an ECB type, a VA type, and a CSH type are characterized in that a liquid crystal material having a negative Δε is used. In particular, VA display devices of AM driving are applied to display devices that need to quickly respond and to have a wide viewing angle, such as television sets.

Nematic liquid crystal compositions used in, for instance, VA display devices need to enable driving at low voltage, a quick response, and a broad range of operating temperature. In other words, a liquid crystal composition having a negative Δε with a large absolute value, low viscosity, and a high nematic phase-isotropic liquid phase transition temperature ($T_{ni}$) has been demanded. In order to control Δn×d that is the product of refractive index anisotropy (Δn) and a cell gap (d) to be a predetermined value, the Δn of a liquid crystal material needs to be adjusted to be in a proper range on the basis of the cell gap. In addition, a quick response is important in liquid crystal display devices applied to television sets or other apparatuses, which generates a need for a liquid crystal material having a small viscosity (η).

A variety of compounds having a negative Δε with a large absolute value have been studied to improve the properties of liquid crystal compositions.

A liquid crystal composition containing the following liquid crystal compounds (A) and (B) each having a 2,3-difluorophenylene structure has been disclosed as a liquid crystal material having a negative Δε (see Patent Literature 1).

[Chem. 1]

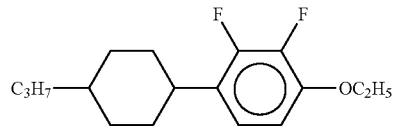
(A)

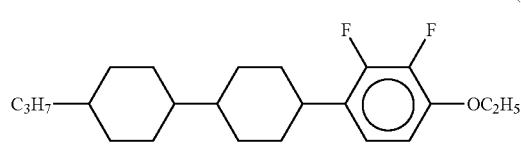
(B)

This liquid crystal composition also contains liquid crystal compounds (C) and (D) as compounds having a Δε of substantially zero; however, the liquid crystal composition does not have a sufficiently low viscosity that is necessary in applications in which a quick response is needed, such as liquid crystal television sets.

[Chem. 2]

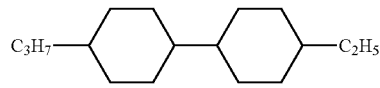
(C)

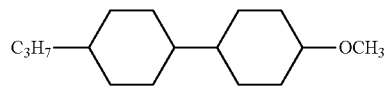
(D)

A liquid crystal composition containing a compound represented by Formula (E) has been disclosed; however, this composition is a liquid crystal composition in which the liquid crystal compound (D) is used in combination and which has a small Δn (see Patent Literature 2) or a liquid crystal composition which contains a compound of which the molecules each contain an alkenyl group (alkenyl compound), such as a liquid crystal compound (F), to improve response speed (see Patent Literature 3). Further study has been necessary in order to give both high Δn and high reliability.

[Chem. 3]

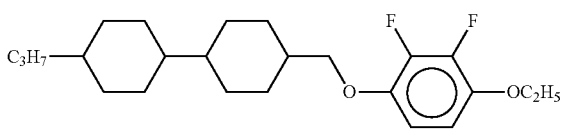
(E)

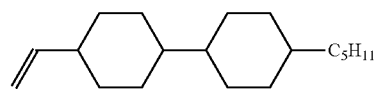
(F)

A liquid crystal composition containing a compound represented by Formula (G) has been disclosed (see Patent Literature 4), but this composition is also a liquid crystal composition containing an alkenyl compound such as the liquid crystal compound (F). Thus, the liquid crystal composition has a problem in which defective display such as image-sticking and uneven display is likely to be caused.

[Chem. 4]

(G)

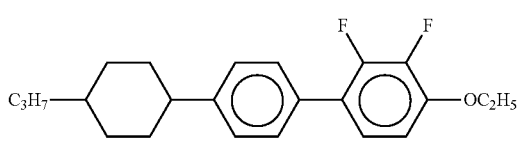

The effect of the liquid crystal composition containing an alkenyl compound on defective display has been disclosed (see Patent Literature 5). In general, a decrease in the alkenyl compound content leads to an increase in the η of a liquid crystal composition, and sufficiently quick response speed is therefore not produced; thus, both requirements of reduced defective display and quick response have not been satisfied at the same time.

Merely combining a compound having a negative Δε with the liquid crystal compound (C), (D), or (F) as described above is not enough to produce a liquid crystal composition that has not only a negative Δε but also both high Δn and low η and that enables a reduction or elimination of defective display.

Moreover, another technique has been disclosed in Patent Literature 6, in which a liquid crystal material having a large index (FoM) represented by (Equation 1) is used to enhance the response speed of a homeotropic liquid crystal cell; however, the enhancement in the response speed of the liquid crystal composition, which has been explained in Description thereof, is insufficient.

[Math. 1]

$$FoM = K_{33} \cdot \Delta n^2 / \gamma 1 \quad \text{(Equation 1)}$$

$K_{33}$: Elastic constant
Δn: Refractive index anisotropy
γ1: Rotational viscosity From such viewpoints, a liquid crystal composition that enables a quick response speed that is necessary in applications such as liquid crystal television sets needs to have both the quality (reliability) that defective display such as image-sticking and uneven display is less likely to be caused and the following properties without reductions in refractive index anisotropy (Δn) and nematic phase-isotropic liquid phase transition temperature ($T_{ni}$): sufficiently low solid phase-nematic phase transition temperature ($T_{cn}$), sufficiently small viscosity (η), sufficiently small rotational viscosity (γ1), and a large elastic constant ($K_{33}$).

CITATION LIST

Patent Literature

PTL 1: Japanese Unexamined Patent Application Publication No. 8-104869
PTL 2: European Patent Application Publication No. 0474062
PTL 3: Japanese Unexamined Patent Application Publication No. 2006-37054
PTL 4: Japanese Unexamined Patent Application Publication No. 2001-354967
PTL 5: Japanese Unexamined Patent Application Publication No. 2008-144135
PTL 6: Japanese Unexamined Patent Application Publication No. 2006-301643

SUMMARY OF INVENTION

Technical Problem

It is an object of the present invention to provide a liquid crystal composition having the following properties without reductions in refractive index anisotropy (Δn) and nematic phase-isotropic liquid phase transition temperature ($T_{ni}$): sufficiently low solid phase-nematic phase transition temperature ($T_{cn}$), sufficiently small viscosity (η), sufficiently small rotational viscosity (γ1), a large elastic constant ($K_{33}$), a negative dielectric anisotropy (Δε) with a large absolute value, and high light resistance. It is another object of the present invention to provide a liquid crystal display device of, for example, a VA type that uses such a liquid crystal composition and that has a high response speed, high reliability, and excellent display quality with defective display being eliminated or reduced.

Solution to Problem

The inventors have studied a variety of compounds and found that a combination of specific compounds enables the above-mentioned objects to be achieved, thereby accomplishing the present invention.

The present invention provides a liquid crystal composition containing a first component that is at least one compound represented by General Formula (I-a)

[Chem. 5]

(I-a)

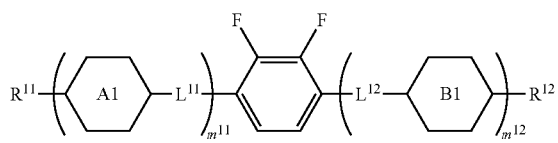

(in the formula, $R^{11}$ and $R^{12}$ each represent an alkyl group having 1 to 8 carbon atoms or an alkenyl group having 2 to 8 carbon atoms; in each of the alkyl and alkenyl groups, —$CH_2$— or at least two —$CH_2$—'s not adjoining each other are each independently optionally substituted with —O— or —S—, and one or more hydrogen atoms are each independently optionally substituted with a fluorine atom or a chlorine atom;

$L^{11}$ and $L^{12}$ each represent —$OCH_2$—, —$CH_2O$—, —$CF_2O$—, —$OCF_2$—, —$CH_2CH_2$—, —$CF_2CF_2$—, or a single bond; in the case where $L^{11}$ and $L^{12}$ are multiple, the multiple $L^{11}$'s may be the same as or different from each other, and the multiple $L^{12}$'s may be the same as or different from each other;

$m^{11}$ and $m^{12}$ each independently represent 0, 1, or 2; $m^{11}+m^{12}$ is 1, 2, or 3;

the rings A1 and B1 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; in the case where the rings A1 and/or B1 are multiple, the multiple rings A1 may be the same as or different from each other, and the multiple rings B1 may be the same as or different from each other; the rings A1 and B1 are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group; and at least one of $R^{11}$ and $R^{12}$ represents an alkenyl group having 2 to 8 carbon atoms) and a second component that is at least one compound represented by General Formula (I-b)

[Chem. 6]

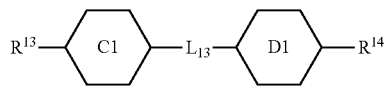
(I-b)

(in the formula, $R^{13}$ and $R^{14}$ each represent an alkyl group having 1 to 8 carbon atoms or an alkenyl group having 2 to 8 carbon atoms; in each of the alkyl and alkenyl groups, —$CH_2$— or at least two —$CH_2$—'s not adjoining each other are each independently optionally substituted with —O— or —S—, and one or more hydrogen atoms are each independently optionally substituted with a fluorine atom or a chlorine atom;

$L^{13}$ represents —$OCH_2$—, —$CH_2O$—, —$CF_2O$—, —$OCF_2$—, —$CH_2CH_2$—, —$CF_2CF_2$—, or a single bond;

the rings C1 and D1 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; and the rings C1 and D1 are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group), wherein the amount of a compound as the second component in which each of $R^{13}$ and $R^{14}$ is not an alkenyl group having 2 to 8 carbon atoms is in the range of 90 to 100 mass %. There is also provided a liquid crystal display device using such a liquid crystal composition.

Advantageous Effects of Invention

The liquid crystal composition of the present invention has a sufficiently low solid phase-nematic phase transition temperature ($T_{cn}$), sufficiently small viscosity (η), sufficiently small rotational viscosity (γ1), a large elastic constant ($K_{33}$), a high voltage holding ratio (VHR), and negative dielectric anisotropy (Δε) with a large absolute value without reductions in refractive index anisotropy (Δn) and nematic phase-isotropic liquid phase transition temperature ($T_{ni}$); hence, a liquid crystal display device of, for instance, a VA type in which such a liquid crystal composition is used has a quick response speed, strong resistance to ultraviolet, high reliability, and excellent display quality with defective display being eliminated or reduced.

DESCRIPTION OF EMBODIMENTS

The liquid crystal composition of the present invention contains any of compounds represented by General Formula (I-a).

[Chem. 7]

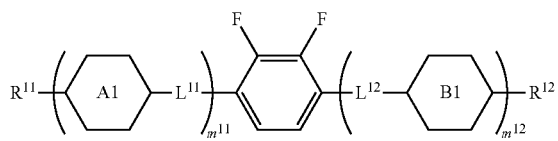
(I-a)

The compounds represented by General Formula (I-a) serve as a first component.

In the formula, $R^{11}$ and $R^{12}$ each represent an alkyl group having 1 to 8 carbon atoms or an alkenyl group having 2 to 8 carbon atoms; in each of the alkyl and alkenyl groups, —$CH_2$— or at least two —$CH_2$—'s not adjoining each other are each independently optionally substituted with —O— or —S—, and one or more hydrogen atoms are each independently optionally substituted with a fluorine atom or a chlorine atom; and at least one of $R^{11}$ and $R^{12}$ represents an alkenyl group having 2 to 8 carbon atoms. The alkenyl group is preferably an alkenyl group having 2 to 5 carbon atoms, more preferably an alkenyl group having 2 to 4 carbon atoms, and further preferably an alkenyl group having 2 or 3 carbon atoms. In the case where each of $R^{11}$ and $R^{12}$ is not an alkenyl group, it is preferably an alkyl group having 1 to 8 carbon atoms or an alkoxy group having 1 to 8 carbon atoms, and more preferably an alkyl group having 1 to 5 carbon atoms or an alkoxy group having 1 to 5 carbon atoms.

$L^{11}$ and $L^{12}$ each represent —$OCH_2$—, —$CH_2O$—, —$CF_2O$—, —$OCF_2$—, —$CH_2CH_2$—, —$CF_2CF_2$—, or a single bond; and preferably —$OCH_2$—, —$CH_2O$—, —$CH_2CH_2$—, or a single bond. In the case where $L^{11}$ and $L^{12}$ are multiple, the multiple $L^{11}$'s may be the same as or different from each other, and the multiple $L^{12}$'s may be the same as or different from each other.

$m^{11}$ and $m^{12}$ each independently represent 0, 1, or 2; and $m^{11}+m^{12}$ is 1, 2, or 3, and preferably 1 or 2.

The rings A1 and B1 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group and are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group. The rings A1 and B1 are each preferably a trans-1,4-cyclohexylene group, a 1,4-phenylene group, a 2-fluoro-1,4-phenylene group, a 3-fluoro-1,4-phenylene group, a naphthalene-2,6-diyl group, or a 1,2,3,4-tetrahydronaphthalene-2,6-diyl group; more preferably a trans-1,4-cyclohexylene group, a 1,4-phenylene group, or a naphthalene-2,6-diyl group; and further preferably a trans-1,4-cyclohexylene group or a 1,4-phenylene group.

In the case where the rings A1 and/or B1 are multiple, the multiple rings A1 may be the same as or different from each other, and the multiple rings B1 may be the same as or different from each other.

In particular, the compound represented by General Formula (I-a) is preferably any of compounds represented by Formulae (I-A1) to (I-A6), (I-B1) to (I-B6), and (I-C1) to (I-C6).

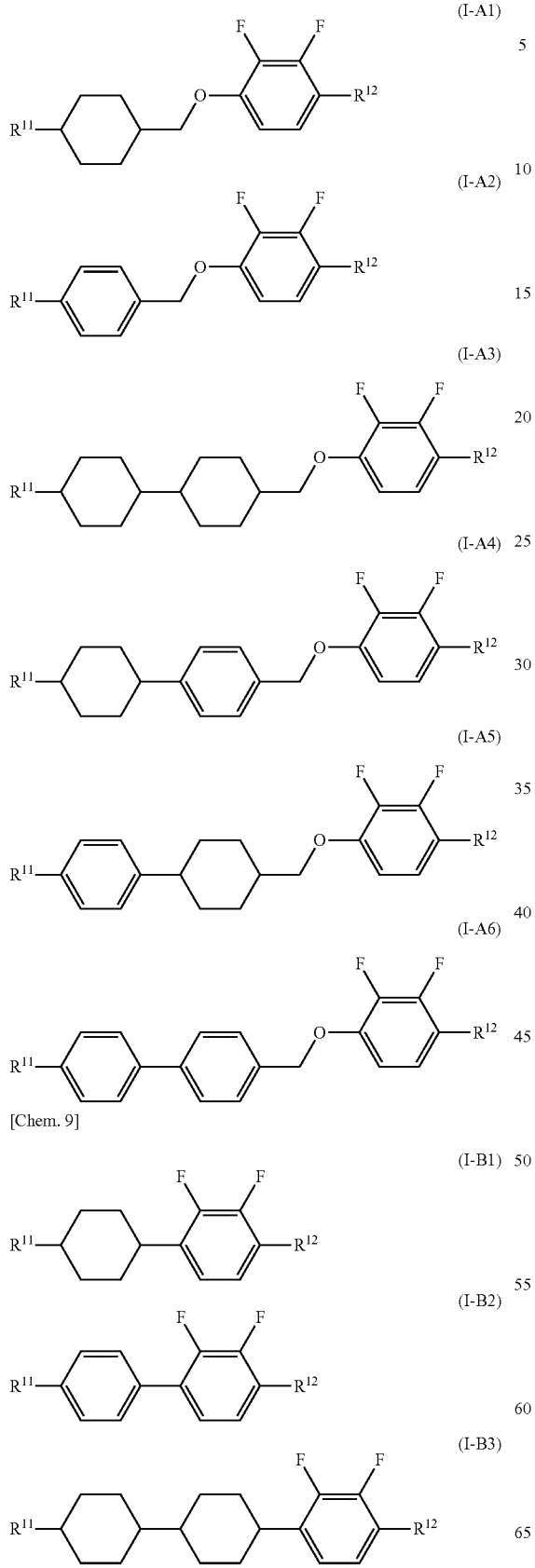
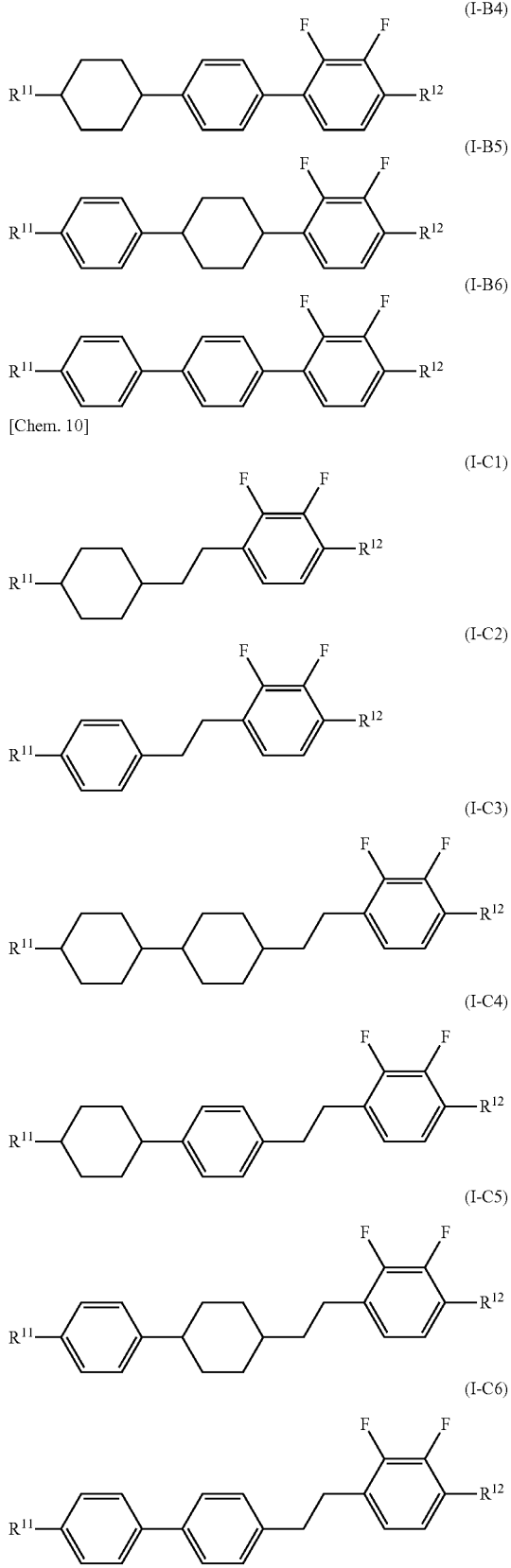
(in the formulae, $R^{11}$ and $R^{12}$ each independently have the same meaning as $R^{11}$ and $R^{12}$ in Formula (I-a))

The compound represented by General Formula (I-a) can be any of compounds represented by General Formula (V).

[Chem. 11]

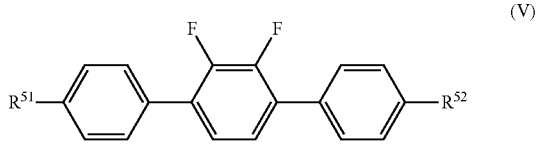

(in the formula, $R^{51}$ and $R^{52}$ each independently have the same meaning as $R^{11}$ and $R^{12}$ in Formula (I-a))

At least one of the compounds represented by General Formula (I-a) is used; it is preferred that two or more of them be used, and it is more preferred that three or more of them be used.

The amount of the compound represented by General Formula (I-a) is from 3 to 60 mass %, preferably 5 to 55 mass %, more preferably 8 to 50 mass %, and especially preferably 10 to 50 mass %. In particular, in order to reduce the viscosity or rotational viscosity, the amount is preferably from 20 to 40 mass %; and in the case of focusing on a reduction in precipitation at low temperature, the amount is preferably from 5 to 30 mass %, more preferably 10 to 25 mass %, and especially preferably 10 to 20 mass %.

The liquid crystal composition of the present invention contains any of compounds represented by General Formula (I-b).

[Chem. 12]

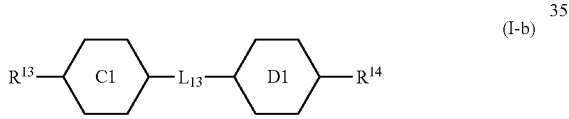

The compounds represented by General Formula (I-b) serve as a second component.

In the formula, $R^{13}$ and $R^{14}$ each represent an alkyl group having 1 to 8 carbon atoms or an alkenyl group having 2 to 8 carbon atoms; in each of the alkyl and alkenyl groups, —CH$_2$— or at least two —CH$_2$—'s not adjoining each other are each independently optionally substituted with —O— or —S—, and one or more hydrogen atoms are each independently optionally substituted with a fluorine atom or a chlorine atom. $R^{13}$ and $R^{14}$ are each preferably an alkyl group having 1 to 5 carbon atoms, an alkoxy group having 1 to 5 carbon atoms, an alkenyl group having 2 to 5 carbon atoms, or an alkenyloxy group having 2 to 5 carbon group; also preferably an alkyl group having 1 to 5 carbon atoms, an alkoxy group having 1 to 5 carbon groups, or an alkenyl group having 2 to 5 carbon atoms; more preferably an alkyl group having 1 to 5 carbon atoms or an alkoxy group having 1 to 5 carbon atoms; and further preferably an alkyl group having 1 to 5 carbon atoms.

$L^{13}$ represents —OCH$_2$—, —CH$_2$O—, —CF$_2$O—, —OCF$_2$—, —CH$_2$CH$_2$—, —CF$_2$CF$_2$—, or a single bond; preferably —CH$_2$CH$_2$— or a single bond; and more preferably a single bond.

The rings C1 and D1 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group and are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group. The rings C1 and D1 are each preferably a trans-1,4-cyclohexylene group, a 1,4-phenylene group, a 2-fluoro-1,4-phenylene group, a 3-fluoro-1,4-phenylene group, a 1,4-cyclohexenylene group, a naphthalene-2,6-diyl group, or a 1,2,3,4-tetrahydronaphthalene-2,6-diyl group; more preferably a trans-1,4-cyclohexylene group, a 1,4-phenylene group, a naphthalene-2,6-diyl group, or a 1,2,3,4-tetrahydronaphthalene-2,6-diyl group; and further preferably a trans-1,4-cyclohexylene group or a 1,4-phenylene group.

In particular, the compound represented by General Formula (I-b) is preferably any of compounds represented by Formulae (I-D1) to (I-D3).

[Chem. 13]

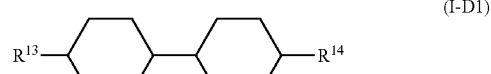

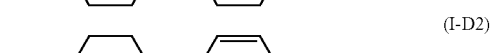

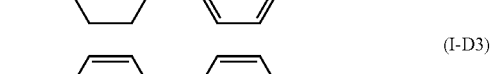

(in the formulae, $R^{13}$ and $R^{14}$ each independently have the same meaning as $R^{13}$ and $R^{14}$ in Formula (I-b))

The compounds represented by General Formula (I-b) serve as the second component; among the compounds as the second component, 90 to 100 mass % of a compound in which each of $R^{13}$ and $R^{14}$ is not an alkenyl group is used. In this case, the alkenyl group includes alkenyl groups of which —CH$_2$— or at least two —CH$_2$—'s not adjoining each other have been each independently substituted with —O— or —S— and of which one or more hydrogen atoms have been each independently substituted with a fluorine atom or a chlorine atom.

The amount of the second component is preferably in the range of 3 to 70 mass %, preferably 5 to 60 mass %, further preferably 5 to 55 mass %, and especially preferably 10 to 55 mass %. In particular, in order to enhance Δn and Tni, the amount is preferably in the range of 15 to 60 mass %; and in the case of focusing on a reduction in precipitation at low temperature, the amount is preferably from 5 to 35 mass %. At least one of the compounds is used as the second component; it is preferred that one to ten of them be used, and it is more preferred that one to five of them be used.

The liquid crystal composition of the present invention can contain any of compounds represented by General Formula (I-c).

[Chem. 14]

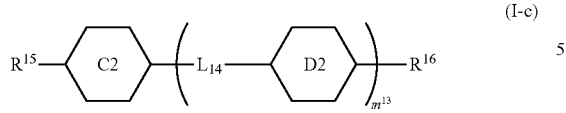

(I-c)

The compounds represented by General Formula (I-c) serve as a third component.

In the formula, $R^{15}$ and $R^{16}$ each represent an alkyl group having 1 to 8 carbon atoms or an alkenyl group having 2 to 8 carbon atoms; in each of the alkyl and alkenyl groups, —CH$_2$— or at least two —CH$_2$—'s not adjoining each other are each independently optionally substituted with —O— or —S—, and one or more hydrogen atoms are each independently optionally substituted with a fluorine atom or a chlorine atom. $R^{15}$ and $R^{16}$ are each preferably an alkyl group having 1 to 5 carbon atoms, an alkyl group having 1 to 5 carbon atoms, an alkenyl group having 2 to 5 carbon atoms, or an alkenyloxy group having 2 to 5 carbon group; and more preferably an alkyl group having 1 to 5 carbon atoms or an alkenyl group having 2 to 5 carbon atoms.

$L^{14}$ represents —OCH$_2$—, —CH$_2$O—, —CF$_2$O—, —OCF$_2$—, —CH$_2$CH$_2$—, —CF$_2$CF$_2$—, or a single bond; preferably —OCH$_2$—, —CH$_2$O—, —CH$_2$CH$_2$—, or a single bond; more preferably —CH$_2$CH$_2$— or a single bond; and further preferably a single bond.

The rings C2 and D2 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group and are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group. The rings C2 and D2 are each preferably a trans-1,4-cyclohexylene group, a 1,4-phenylene group, a 2-fluoro-1,4-phenylene group, a 3-fluoro-1,4-phenylene group, a 3,5-difluoro-1,4-phenylene group, or a naphthalene-2,6-diyl group; and more preferably a trans-1,4-cyclohexylene group, a 1,4-phenylene group, or a naphthalene-2,6-diyl group.

The multiple rings D2 may be the same as or different from each other. $m^{13}$ represents 2 or 3.

In particular, the compound represented by General Formula (I-c) is preferably any of compounds represented by Formulae (I-E1) to (I-E9).

[Chem. 15]

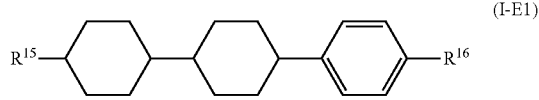

(I-E1)

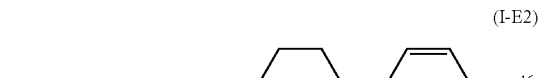

(I-E2)

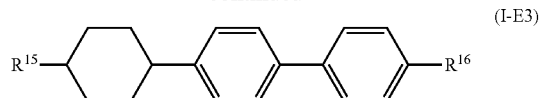

(I-E3)

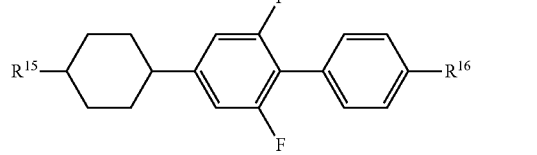

(I-E4)

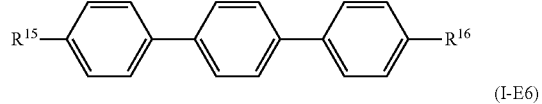

(I-E5)

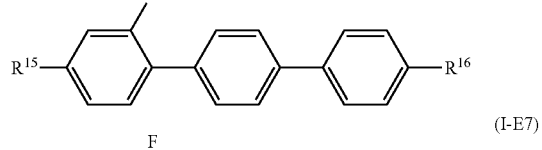

(I-E6)

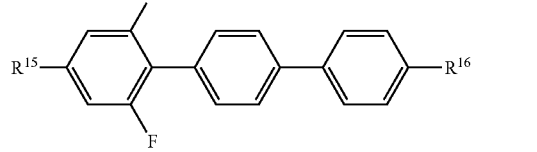

(I-E7)

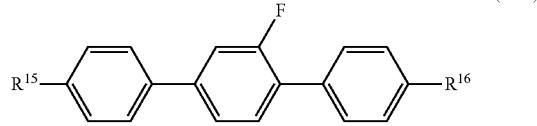

(I-E8)

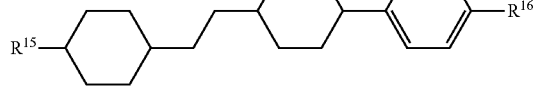

(I-E9)

(in the formulae, $R^{15}$ and $R^{16}$ each independently have the same meaning as $R^{15}$ and $R^{16}$ in Formula (I-c))

The compound represented by General Formula (I-c) is also preferably any of compounds represented by General Formulae (Np-1) and (Np-2).

[Chem. 16]

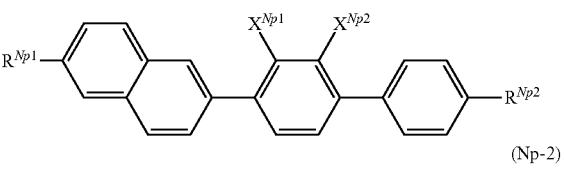

(Np-1)

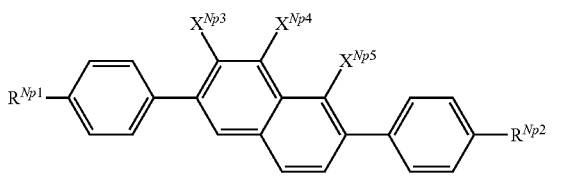

(Np-2)

(in the formulae, $R^{Np1}$ and $R^{Np2}$ each independently represent an alkyl group having 1 to 5 carbon atoms or an alkenyl group having 2 to 5 carbon atoms; in each of the alkyl and alkenyl groups, one —$CH_2$— or at least two —$CH_2$—'s not adjoining each other are each independently optionally substituted with —O— or —S—, and one or more hydrogen atoms are each independently optionally substituted with a fluorine atom; and $X^{Np1}$, $X^{Np2}$, $X^{Np3}$, $X^{Np4}$, and $X^{Np5}$ each independently represent a hydrogen atom or a fluorine atom) Using the compounds represented by General Formulae (Np-1) and (Np-2) in a polymerizable-compound-containing liquid crystal composition used for producing a liquid crystal display device of, for example, a PSA or PSVA mode gives effects in which the polymerization rate of the polymerizable compound is sufficiently high and in which the residue of the polymerizable compound after the polymerization is eliminated or sufficiently reduced. Hence, for example, these compounds can be also employed as an adjuster that adjusts the polymerization rate of the polymerizable compound to be suitable for a lamp used for UV exposure in the polymerization.

The amount of the third component is in the range of 3 to 40 mass %, preferably 5 to 30 mass %, more preferably 5 to 25 mass %, and especially preferably 10 to 25 mass %. In particular, in order to enhance Δn and Tni, the amount is preferably in the range of 15 to 35 mass %; and in the case of focusing on a reduction in precipitation at low temperature, the amount is preferably from 5 to 20 mass %. At least one of the compounds is used as the third component; it is preferred that one to ten of them be used, and it is more preferred that one to five of them be used.

In the liquid crystal composition of the present invention, the total amount of the compounds that serve as the first to third components is preferably from 80% to 100%, more preferably 85% to 100%, further preferably 90% to 100%, and especially preferably 95% to 100%.

The dielectric anisotropy (Δε) of the liquid crystal composition of the present invention at 20° C. is in the range of −2.0 to −8.0, preferably −2.0 to −6.0, more preferably −2.0 to −5.0, and especially preferably −2.5 to −4.0. More specifically, the Δε is preferably from −2.0 to −4.5 in terms of the response speed of the liquid crystal material or from −3.5 to −6.0 in terms of a driving voltage.

The refractive index anisotropy (Δn) of the liquid crystal composition of the present invention at 20° C. is from 0.08 to 0.14, preferably 0.09 to 0.13, and especially preferably 0.09 to 0.12. More specifically, the refractive index anisotropy is preferably from 0.10 to 0.13 for a thin cell gap or from 0.08 to 0.10 for a thick cell gap.

The viscosity (η) of the liquid crystal composition of the present invention at 20° C. is from 5 to 30 mPa·S, preferably 10 to 25 mPa·S, and especially preferably 10 to 22 mPa·S.

The rotational viscosity (γ₁) of the liquid crystal composition of the present invention at 20° C. is from 60 to 150 mPa·S, preferably 60 to 110 mPa·S, and especially preferably 60 to 100 mPa·S.

The nematic phase-isotropic liquid phase transition temperature ($T_{ni}$) of the liquid crystal composition of the present invention is from 60° C. to 120° C., preferably 70° C. to 100° C., and especially preferably 70° C. to 85° C.

The elastic constant ($K_{33}$) of the liquid crystal composition of the present invention is not less than 12.5, preferably not less than 13.0, more preferably not less than 13.5, and especially preferably not less than 14.0.

In addition to the above-mentioned compounds, the liquid crystal composition of the present invention may contain, for example, general nematic liquid crystal, smectic liquid crystal, cholesteric liquid crystal, antioxidants, and ultraviolet absorbers.

The liquid crystal composition of the present invention may contain at least one polymerizable compound.

The liquid crystal composition containing a polymerizable compound can be used in production of a liquid crystal display device of, for instance, a PSA mode or PSVA mode.

Specific examples of such a polymerizable compound include compounds having the following structure.

[Chem. 17]

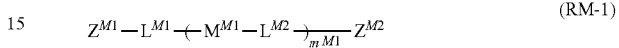

(RM-1)

The structure is represented by General Formula (RM-1).
In the formula, $Z^{M1}$ and $Z^{M2}$ each independently represent the following structure.

[Chem. 18]

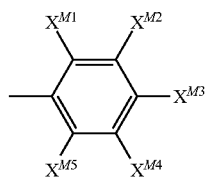

$X^{M1}$ to $X^{M5}$ each represent a hydrogen atom, a fluorine atom, or the following structure.

—$S^{M1}$—$R^{M1}$ [Chem. 19]

At least one of $X^{M1}$ to $X^{M5}$ is the following structure.

—$S^{M1}$—$R^{M1}$ [Chem. 20]

$X^{M2}$ or $X^{M3}$ is preferably this structure.

—$S^{M1}$—$R^{M1}$ [Chem. 21]

$X^{M3}$ is preferably

—$S^{M1}$—$R^{M1}$ [Chem. 22]

this structure.

$S^{M1}$ represents an alkylene group having 1 to 12 carbon atoms or a single bond, and —$CH_2$— of the alkylene group is optionally substituted with an oxygen atom, —COO—, —OCO—, or —OCOO— provided that oxygen atoms are not directly bonded to each other. In a PSA liquid crystal display device, at least one of them is preferably a single bond, and compounds in which they each represent a single bond and compounds in which one of them is a single bond and in which the other one thereof represents an alkylene group having 1 to 8 carbon atoms or —O—$(CH_2)_s$— are preferred. In this case, an alkylene group having 1 to 4 carbon atoms is preferably employed, and s preferably ranges from 1 to 4.

$R^{M1}$ represents any of the following structures represented by Formulae (R-1) to (R-15).

[Chem. 23]

(R-1)

-continued

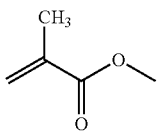
(R-2)

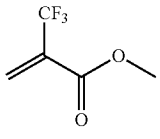
(R-3)

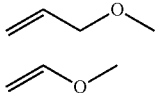
(R-4)

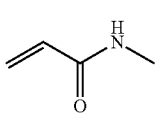
(R-5)

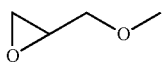
(R-6)

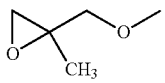
(R-7)

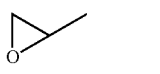
(R-8)

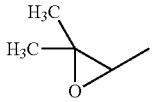
(R-9)

(R-10)

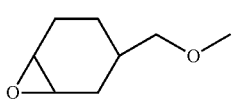
(R-11)

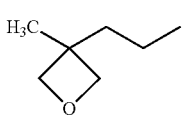
(R-12)

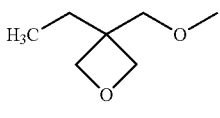
(R-13)

(R14)

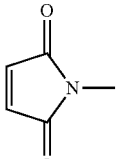

(R-15)

HS—

$R^{M1}$ preferably represents the structure represented by Formula (R-1) or (R-2).

$L^{M1}$ and $L^{M2}$ each independently represent a single bond, —O—, —CH$_2$—, —OCH$_2$—, —CH$_2$O—, —CO—, —C$_2$H$_4$—, —COO—, —OCO—, —CH═CH—COO—, —COO—CH═CH—, —OCO—CH═CH—, —CH═CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH═CH—, —CF═CH—, —CH═CF—, —CF═CF—, —CF$_2$—, —CF$_2$O—, —OCF$_2$—, —CF$_2$CH$_2$—, —CH$_2$CF$_2$—, —CF$_2$CF$_2$—, or —C≡C—; in the case where $L^{M2}$ is multiple, the multiple $L^{M2}$'s may be the same as or different from each other. $L^{M1}$ and $L^{M2}$ are each independently preferably —COO—, —OCO—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —C≡C—, or a single bond; and more preferably —COO—, —OCO—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, or a single bond.

$M^{M1}$ represents a 1,4-phenylene group, a 1,4-cyclohexylene group, or a naphthalene-2,6-diyl group and is optionally subjected to substitution of a hydrogen atom thereof with a fluorine atom, a chlorine atom, an alkyl group having 1 to 8 carbon atoms, a halogenated alkyl group having 1 to 8 carbon atoms, a halogenated alkoxy group having 1 to 8 carbon atoms, an alkoxy group having 1 to 8 carbon atoms, a nitro group, or $$-S^{M1}-R^{M1} \qquad [\text{Chem. 24}]$$

this structure.

$m^{M1}$ represents 0, 1, or 2, and preferably 0 or 1.

In the case where $X^{M1}$ to $X^{M5}$, $S^{M1}$, $R^{M1}$, $L^{M2}$ and/or $M^{M1}$ are multiple, corresponding ones of them may be the same as or different from each other.

More specifically, in the case where $L^{M1}$ in the polymerizable compound represented by General Formula (RM-1) is a single bond and where $m^{M1}$ is 0, the structure of the rings is preferably any of the following structures represented by Formulae (XXa-1) to (XXa-5), more preferably any of the structures represented by Formulae (XXa-1) to (XXa-3), and especially preferably any of the structures represented by Formulae (XXa-1) and (XXa-2).

[Chem. 25]

(XXa-1)

[Chem. 26]

(XXa-2)

[Chem. 27]

(XXa-3)

[Chem. 28]

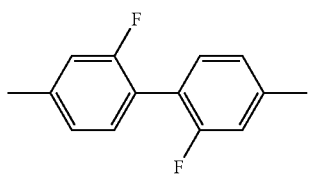
(XXa-4)

[Chem. 29]

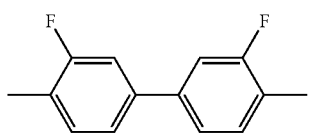
(XXa-5)

(The two ends of each structure are bonded to

—$S^{M1}$—$R^{M1}$ [Chem. 30]

this structure)

Polymerizable compounds represented by General Formula (RM-1) and having such skeletons enable uneven display to be reduced or eliminated in PSA liquid crystal display devices because such polymerizable compounds have optimum alignment regulating force therefor after being polymerized and thus produce a good alignment state.

Accordingly, the polymerizable compound is more specifically preferably any of compounds represented by Formula (XX-1) to General Formula (XX-10), and more preferably any of compounds represented by Formulae (XX-1) to (XX-4).

[Chem. 31]

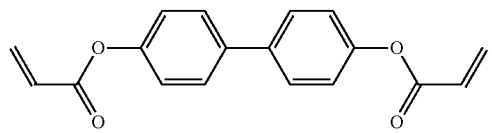
(XX-1)

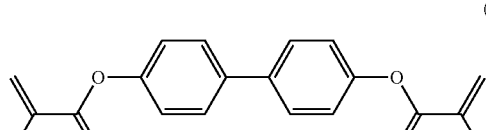
(XX-2)

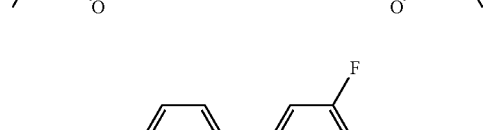
(XX-3)

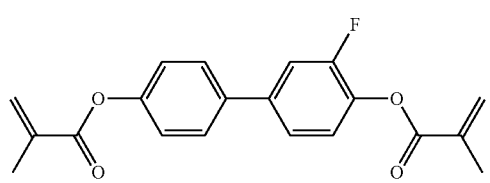
(XX-4)

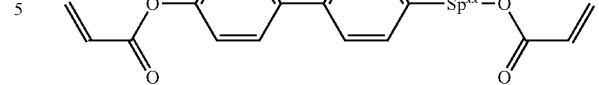
(XX-5)

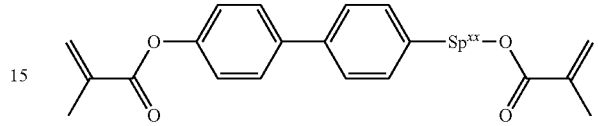
(XX-6)

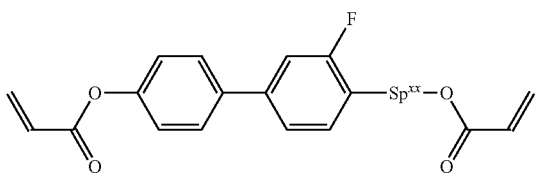
(XX-7)

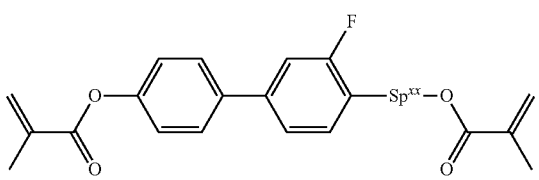
(XX-8)

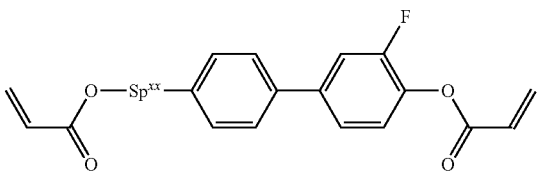
(XX-9)

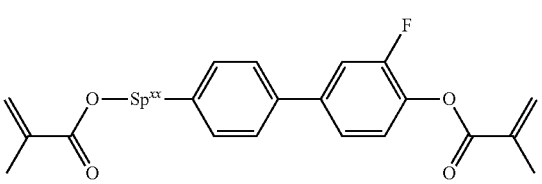
(XX-10)

In the formulae, $Sp^{xx}$ represents an alkylene group having 1 to 8 carbon atoms or —O—$(CH_2)_s$— (where s represents an integer from 2 to 7, and the oxygen atom is bonded to a ring).

In the case where $m^{M1}$ in the polymerizable compound represented by General Formula (RM-1) is 1, polymerizable compounds represented by, for instance, Formulae (M31) to (M48) and (M4-1) to (M4-7) are preferred.

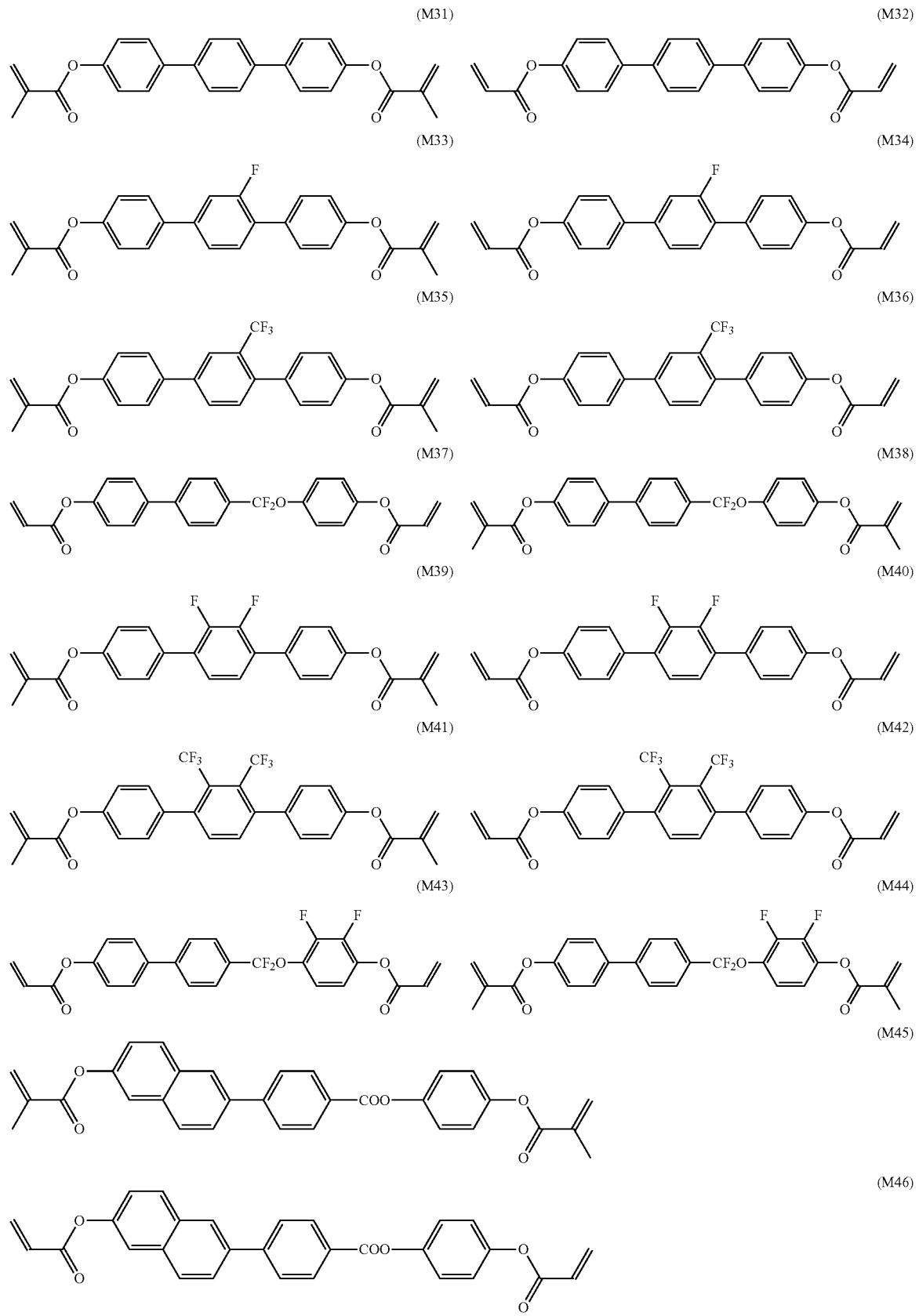

-continued

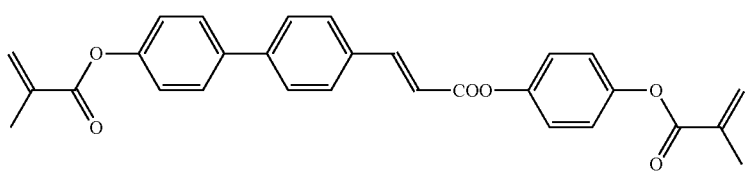
(M47)

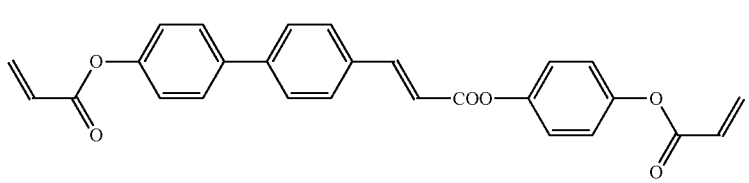
(M48)

[Chem. 33]

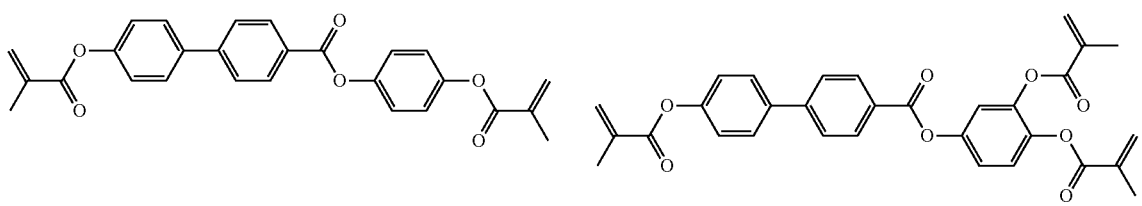
(M4-1) (M4-2)

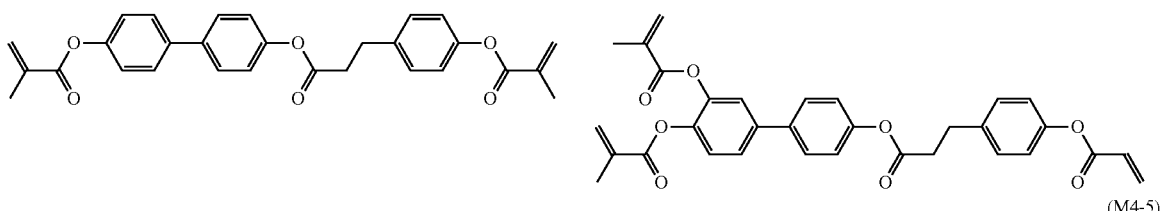
(M4-3) (M4-4)

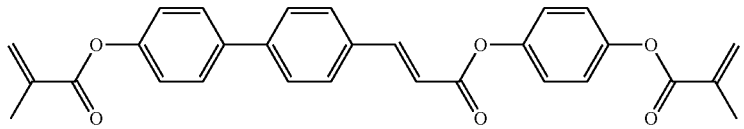
(M4-5)

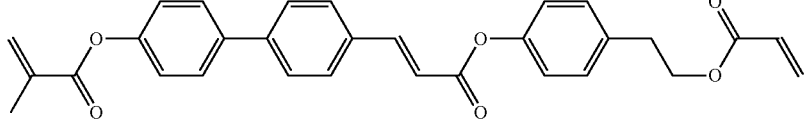
(M4-6)

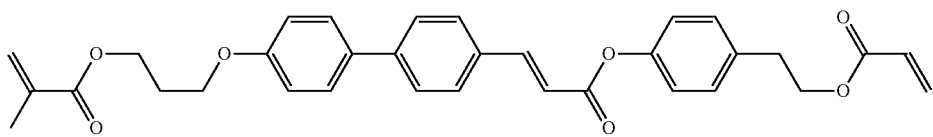
(M4-7)

In each of the formulae, hydrogen atoms of a phenyl group and naphthalene group are optionally substituted with —F, —Cl, —CF$_3$, —CH$_3$, or any of the structures represented by Formulae (R-1) to (R-15).

Polymerizable compounds represented by General Formula (RM-1) and having such skeletons enable uneven display to be reduced or eliminated in PSA liquid crystal display devices because such polymerizable compounds have optimum alignment regulating force therefor after being polymerized and thus produce a good alignment state.

In the case where $L^{M1}$ in the polymerizable compound represented by General Formula (RM-1) is a single bond and where $m^{M1}$ is 1, polymerizable compounds represented by, for example, Formulae (M301) to (M316) are also preferred.

[Chem. 34]
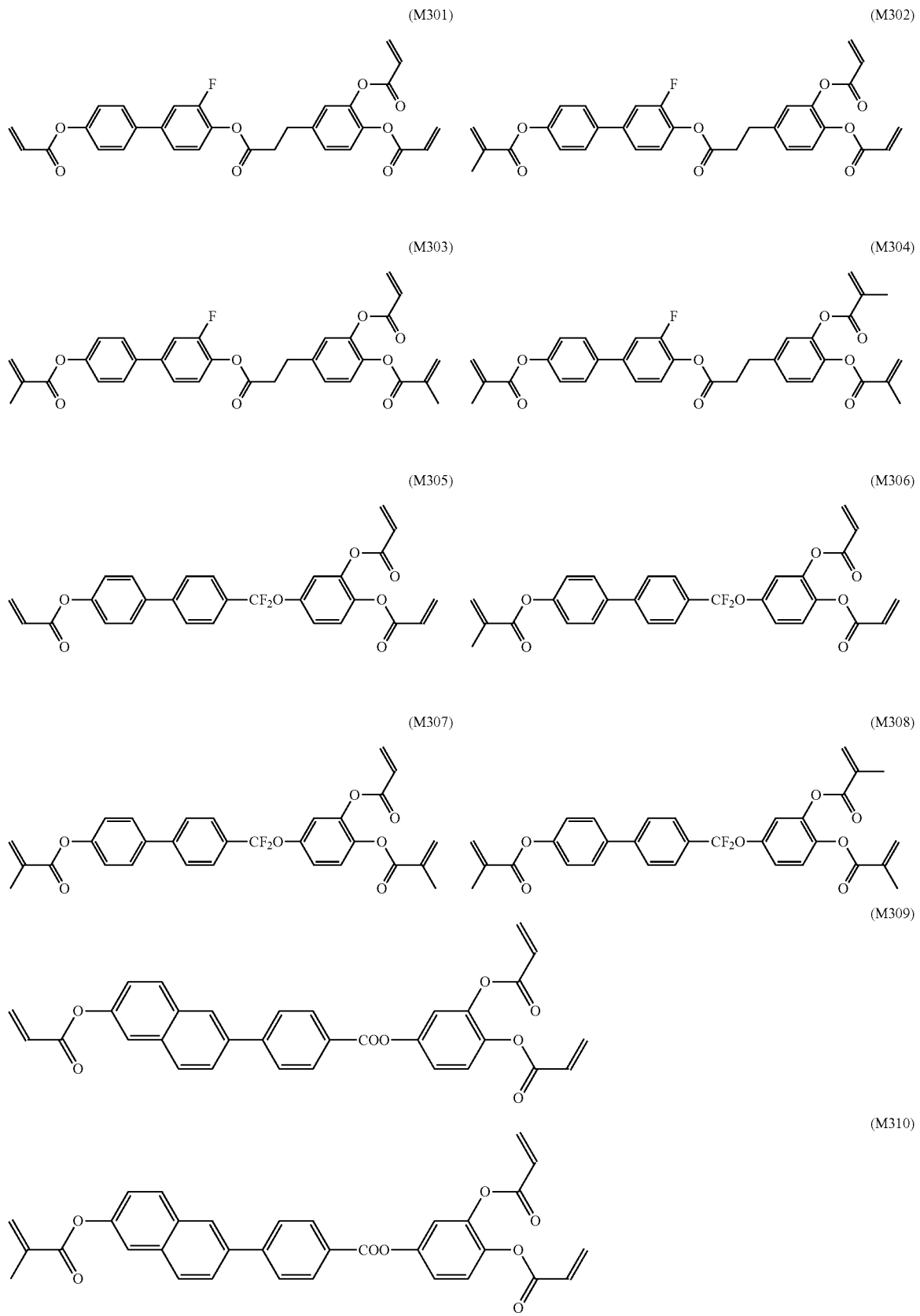

-continued

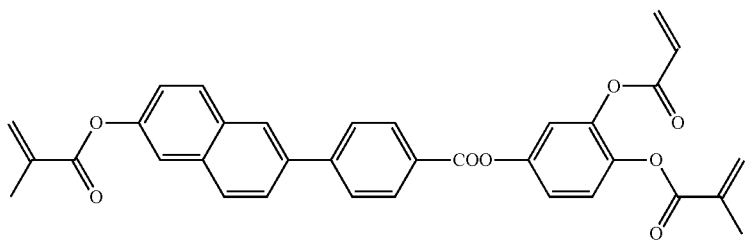
(M311)

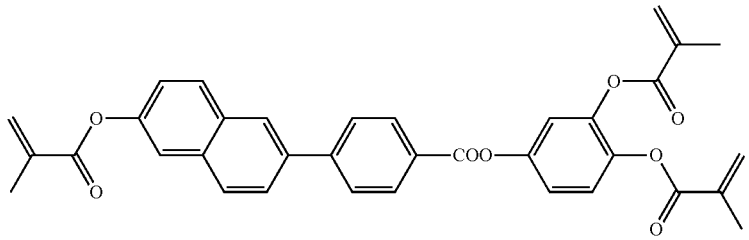
(M312)

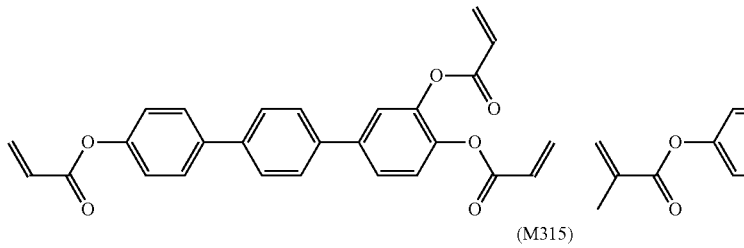
(M313)

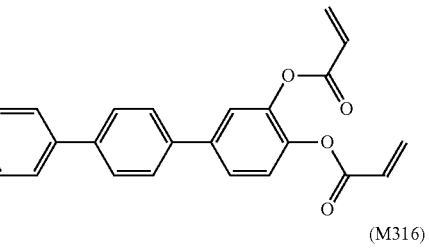
(M314)

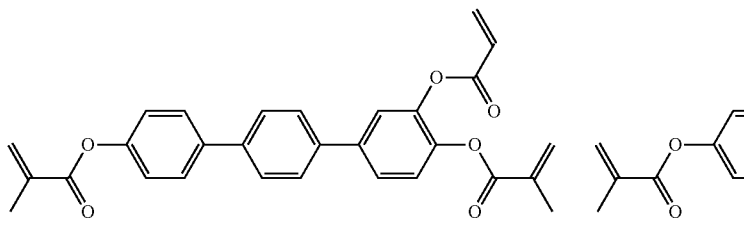
(M315)

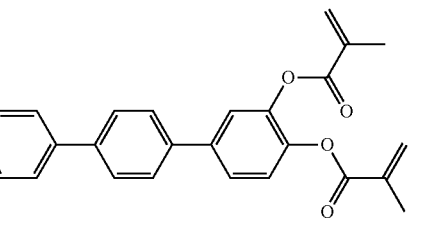
(M316)

Insufficiency in the amount of the polymerizable compound results in weak alignment regulating force that affects the liquid crystal composition. Excess in the amount of the polymerizable compound enhances necessary energy for polymerization and therefore increases the amount of the polymerizable compound that remains without being polymerized, which causes defective display. Thus, the amount is preferably in the range of 0.01 to 2.00 mass %, more preferably 0.05 to 1.00 mass %, and especially preferably 0.10 to 0.50 mass %.

Polymerizable compounds represented by General Formula (RM-1) and having such skeletons enable uneven display to be reduced or eliminated in PSA liquid crystal display devices because such polymerizable compounds have optimum alignment regulating force therefor after being polymerized and thus produce a good alignment state.

The polymerizable-compound-containing liquid crystal composition in which the polymerizable compound has been added to the liquid crystal composition of the present invention has a low viscosity ($\eta$), low rotational viscosity ($\gamma_1$), and a large elastic constant ($K_{33}$); hence, PSA or PSVA liquid crystal display devices using such a composition can satisfy both requirements of reduced uneven display and quick response at the same time.

The liquid crystal composition of the present invention may further contain any of compounds represented by General Formula (Q).

[Chem. 35]

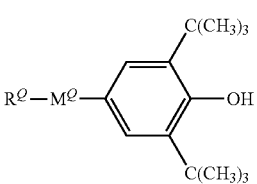
(Q)

In the formula, $R^Q$ represents a linear or branched alkyl group having 1 to 22 carbon atoms; one $CH_2$ group or at least two $CH_2$ groups not adjoining each other in the alkyl group are optionally substituted with —O—, —CH=CH—, —CO—, —OCO—, —COO—, —C≡C—, —CF$_2$O—, or —OCF$_2$—.

$M^Q$ represents a trans-1,4-cyclohexylene group, a 1,4-phenylene group, or a single bond.

In particular, the compound represented by General Formula (Q) is preferably any of compounds represented by General Formulae (Q-a) to (Q-e).

[Chem. 36]

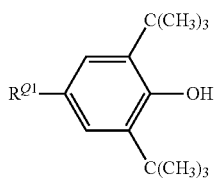
(Q-a)

[Chem. 37]

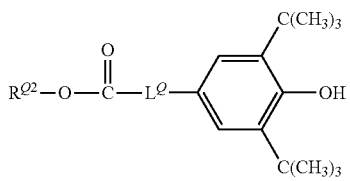
(Q-b)

[Chem. 38]

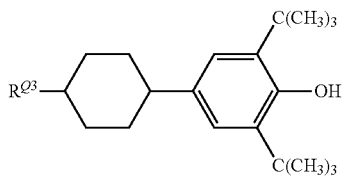
(Q-c)

[Chem. 39]

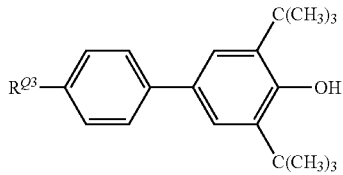
(Q-d)

[Chem. 40]

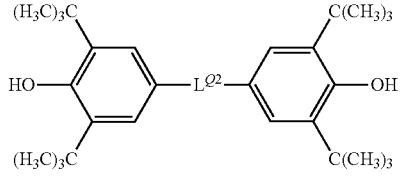
(Q-e)

In the formula, $R^{Q1}$ is preferably a linear or branched alkyl group having 1 to 10 carbon atoms.

$R^{Q2}$ is preferably a linear or branched alkyl group having 1 to 20 carbon atoms.

$R^{Q3}$ is preferably a linear or branched alkyl or alkoxy group having 1 to 8 carbon atoms.

$L^Q$ is preferably a linear or branched alkylene group having 1 to 8 carbon atoms.

$L^{Q2}$ is preferably a linear or branched alkylene group having 2 to 12 carbon atoms.

Among the compounds represented by General Formulae (Q-a) to (Q-e), the compounds represented by General Formulae (Q-c), (Q-d), and (Q-e) are more preferred.

The liquid crystal composition of the present invention contains at least one of compounds represented by General Formula (Q); it is preferred that one to five of them be used, it is more preferred that one to three of them be used, and it is especially preferred that one of them be used. The amount of the compound is preferably in the range of 0.001 mass % to 1 mass %, more preferably 0.001 mass % to 0.1 mass %, and especially preferably 0.001 mass % to 0.05 mass %.

The liquid crystal display device using the liquid crystal composition of the present invention is particularly characterized in high response speed; in particular, it is useful as an active-matrix liquid crystal display device and can be used in liquid crystal display devices of a PSA mode, PSVA mode, VA mode, IPS mode, and ECB mode.

The liquid crystal composition of the present invention is used in liquid crystal display devices in which the birefringence of the liquid crystal composition is utilized for control of the amount of light that is to be transmitted. Such a liquid crystal composition is useful for liquid crystal display devices, such as an AM-LCD (active-matrix liquid crystal display device), a TN (nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

Two substrates used in a liquid crystal cell included in a liquid crystal display device can be made of a transparent material having flexibility, such as glass or a plastic material, and one of these substrates may be made of a non-transparent material such as silicon. In order to form a transparent electrode layer on a transparent substrate such as a glass plate, for example, indium tin oxide (ITO) is sputtered on the transparent substrate.

A color filter can be produced by, for instance, a pigment dispersion technique, a printing technique, an electrodeposition technique, or a staining technique. In production of the color filter by, for example, a pigment dispersion technique, a curable colored composition for a color filter is applied onto the transparent substrate, subjected to patterning, and then cured by being heated or irradiated with light. This process is carried out for each of three colors of red, green, and blue, thereby being able to produce the pixels of the color filter. Active elements such as a TFT, a thin-film diode, a metal insulator, and a metal specific resistance element may be provided on the resulting substrate to form pixel electrodes.

The substrates are arranged so as to face each other with the transparent electrode layer interposed therebetween. In the arrangement of the substrates, a spacer may be present between the substrates to adjust the distance therebetween. In this case, the distance between the substrates is adjusted so that the thickness of a light modulating layer to be formed is preferably in the range of 1 to 100 μm, and more preferably 1.5 to 10 μm. In the case where a polarizing plate is used, the product of the refractive index anisotropy Δn of liquid crystal and a cell thickness d is preferably adjusted for maximization of contrast. In the case where two polarizing plates are used, the polarization axis of each polarizing plate may be adjusted to give a good viewing angle or contrast. Furthermore, a retardation film may be also used to increase a viewing angle. The spacer can be made of, for instance, glass particles, plastic particles, alumina particles, or photoresist materials. A sealing material such as a thermosetting epoxy composition is subsequently applied to the substrates by screen printing in a state in which a liquid crystal inlet has been formed, the substrates are attached to each other, and then the sealing material is heated to be thermally cured.

The liquid crystal composition can be put into the space between the two substrates by, for example, a vacuum injection technique or ODF technique which is generally employed.

Since a proper polymerization rate is desired to enable liquid crystal molecules to be aligned in a good manner, the polymerizable compound in the polymerizable-compound-containing liquid crystal composition in which the polymerizable compound has been added to the liquid crystal composition of the present invention is preferably polymerized by being irradiated with one of active energy rays, such as ultraviolet rays and an electron beam, or by being irradiated with such active energy rays used in combination or in sequence. In the use of ultraviolet rays, a polarized light source or a non-polarized light source may be used. In the case where the polymerization is carried out in a state in which the polymerizable-compound-containing liquid crystal composition has been disposed between the two substrates, at least the substrate on the side from which active energy rays are emitted needs to have transparency suitable for the active energy rays. Another technique may be used, in which only the intended part is polymerized by being irradiated with light with a mask, the alignment state of the non-polymerized part is subsequently changed by adjustment of conditions such as an electric field, a magnetic field, or temperature, and then polymerization is further carried out through irradiation with active energy rays. In particular, it is preferred that exposure to ultraviolet radiation be carried out while an alternating current electric field is applied to the polymerizable-compound-containing liquid crystal composition. The alternating current electric field to be applied preferably has a frequency ranging from 10 Hz to 10 kHz, and more preferably 60 Hz to 10 kHz; and the voltage is determined on the basis of a predetermined pretilt angle in a liquid crystal display device. In other words, the pretilt angle in a liquid crystal display device can be controlled by adjustment of voltage that is to be applied. In MVA liquid crystal display devices, a pretilt angle is preferably controlled to be from 80 degrees to 89.9 degrees in view of alignment stability and contrast.

The temperature in the irradiation procedure is preferably within a temperature range in which the liquid crystal state of the liquid crystal composition of the present invention can be maintained. Polymerization is preferably carried out at a temperature close to room temperature, i.e., typically from 15 to 35° C. Preferred examples of a lamp that is usable for emitting ultraviolet rays include a metal halide lamp, a high pressure mercury lamp, and an ultrahigh pressure mercury lamp. In addition, ultraviolet rays to be emitted preferably have a wavelength that is in a wavelength region different from the wavelength region of light absorbed by the liquid crystal composition; it is preferred that ultraviolet rays in a particular wavelength range be cut off as needed. The intensity of ultraviolet rays to be emitted is preferably from 0.1 mW/cm² to 100 W/cm², and more preferably 2 mW/cm² to 50 W/cm². The energy of ultraviolet rays to be emitted can be appropriately adjusted: preferably from 10 mJ/cm² to 500 J/cm², and more preferably 100 mJ/cm² to 200 J/cm². The intensity may be changed in the exposure to ultraviolet radiation. The time of the exposure to ultraviolet radiation is appropriately determined on the basis of the intensity of ultraviolet rays to be emitted: preferably from 10 seconds to 3600 seconds, and more preferably 10 seconds to 600 seconds.

EXAMPLES

Although the present invention will now be described further in detail with reference to Examples, the present invention is not limited thereto. In compositions which will be described in Examples and Comparative Examples, the term "%" refers to "mass %".

In Examples, compounds are abbreviated as follows.

(Side Chains)

-n —$C_nH_{2n+1}$ linear alkyl group having n carbon atoms n- $C_nH_{2n+1}$— linear alkyl group having n carbon atoms —On —$OC_nH_{2n+1}$ linear alkoxyl group having n carbon atoms nO— $C_nH_{2n+1}O$— linear alkoxyl group having n carbon atoms

—V —CH=$CH_2$

V— $CH_2$=CH—

—V1 —CH=CH—$CH_3$

1V— $CH_3$—CH=CH—

-2V —$CH_2$—$CH_2$—CH=$CH_3$

V2- $CH_3$=CH—$CH_2$—$CH_2$—

-2V1 —$CH_2$—$CH_2$—CH=CH—$CH_3$

1V2- $CH_3$—CH=CH—$CH_2$—$CH_2$ (Ring Structures)

[Chem. 41]

Cy

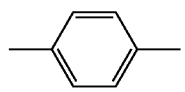
Ph

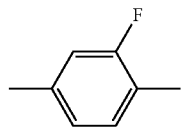
Ph1

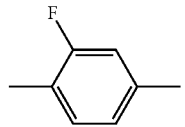
Ph2

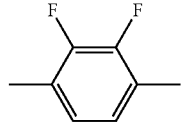
Ph5

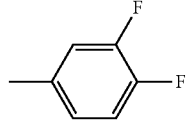
Ph6

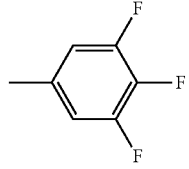
Ph7

-continued

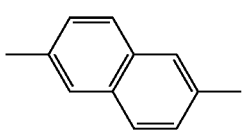
Np

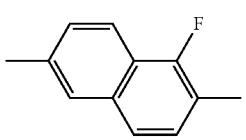
Np1

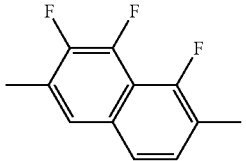
Np5

In Examples, the following properties were measured.

$T_{ni}$: Nematic phase-isotropic liquid phase transition temperature (° C.)

$T_{cn}$: Solid phase-nematic phase transition temperature (° C.)

Δn: Refractive index anisotropy at 20° C.

Δε: Dielectric anisotropy at 20° C.

η: Viscosity at 20° C. (mPa·s)

$γ_1$: Rotational viscosity at 20° C. (mPa·s)

$K_{33}$: Elastic constant $K_{33}$ at 20° C. (pN)

Initial Voltage Holding Ratio (VHR): VHR measured before UV radiation (%)

Voltage holding ratio (VHR) after UV radiation: VHR measured after UV radiation (%)

In the case of generating a pretilt angle in a test cell, the test cell was irradiated with 60 J (365 nm) of UV under application of a square wave voltage of 10 V at a frequency of 100 kHz. The UV light source was a multilight manufactured by USHIO INC.

In measurement of the response speed of a sample, a test cell having a thickness of 3.5 μm and including an alignment film of JALS2096 was used, Vsel was 5 V, Vnsel was 1 V, measurement temperature was 20° C., and DMS301 manufactured by AUTRONIC-MELCHERS GmbH was used.

In evaluation of the UV resistance of a test cell, UV was radiated at 100 mW/cm$^{-2}$ for a predetermined time with SP-7 (manufactured by USHIO INC.), and VHRs before and after the UV radiation were measured.

VHRs were measured with VHR-1 (manufactured by TOYO Corporation) at 1 V, 60 Hz, and 60° C.

Comparative Example 1 and Examples 1 to 8

Liquid crystal compositions LC-A (Comparative Example 1), LC-1 (Example 1), LC-2 (Example 2), LC-3 (Example 3), LC-4 (Example 4), LC-5 (Example 5), LC-6 (Example 6), LC-7 (Example 7), and LC-8 (Example 8) were prepared; and the physical properties thereof were measured. Tables 1 and 2 show the constitution and measured physical properties of the liquid crystal compositions.

TABLE 1

|  | Comparative Example 1 LC-A | Example 1 LC-1 | Example 2 LC-2 | Example 3 LC-3 | Example 4 LC-4 |
|---|---|---|---|---|---|
| 1V-Cy-1O—Ph5—O2 | 8 | 14 | 10 | 10 | 15.5 |
| 1V-Cy-1O—Ph5—O3 |  |  | 2 | 6 |  |
| V-Cy-Cy-1O—Ph5—O2 | 3 |  |  |  |  |
| 1V-Cy-Cy-1O—Ph5—O2 | 10 | 16 | 10 | 10 | 18 |
| 1V-Cy-Cy-1O—Ph5—O3 |  |  | 8 | 8 |  |
| 3-Cy-Cy-2 |  | 25.5 | 20 | 20 | 20 |
| 3-Cy-Cy-4 |  | 6 | 8 | 6 | 8 |
| 3-Cy-Cy-5 |  |  |  | 2 |  |
| 3-Cy-Cy-O2 |  |  | 11 |  |  |
| 3-Cy-Ph—O1 |  |  |  |  | 4 |
| 2-Cy-Cy-V1 | 25 |  |  |  |  |
| 3-Cy-Cy-V1 | 8 |  |  |  |  |
| 3-Cy-1O—Ph5—O1 | 6 |  |  |  |  |
| 3-Cy-1O—Ph5—O2 | 13 |  |  |  |  |
| 3-Cy-Cy-1O—Ph5—O2 |  | 4 |  |  |  |
| 2-Cy-Ph—Ph5—O2 |  | 6 | 6 |  |  |
| 3-Cy-Ph—Ph5—O2 |  |  | 8 | 10 | 10 |
| 3-Cy-Ph—Ph5—O3 |  |  | 4 |  |  |
| 3-Cy-Ph—Ph5—O4 |  | 6 |  |  |  |
| 4-Cy-Ph—Ph5—O3 |  |  |  |  |  |
| 3-Ph—Ph-1 |  | 11 | 6 | 12 | 10.5 |
| 5-Ph—Ph-1 |  |  |  |  |  |
| 3-Cy-Cy-Ph-1 | 5 |  |  |  |  |
| 3-Cy-Ph—Ph-2 | 8 | 6.5 |  |  |  |
| 5-Cy-Ph—Ph-2 | 6 |  |  |  |  |
| V-Cy-Cy-Ph-1 |  |  |  | 10 | 10 |
| V-Cy-Ph—Ph-3 | 5 |  |  |  |  |
| 1V-Cy-Ph—Ph-3 |  |  |  |  |  |
| 3-Np—Ph5—Ph-2 | 3 | 3 | 5 | 4 | 4 |
| Total | 100 | 100 | 100 | 100 | 100 |
| Tni [° C.] | 76 | 75 | 77 | 75 | 76 |
| Tcn [° C.] | −35 | −19 | −14 | −20 | −29 |
| Δn | 0.108 | 0.109 | 0.106 | 0.108 | 0.109 |
| Δε | −3.2 | −3.1 | −3.3 | −3.0 | −3.1 |
| $γ_1$ [mPa·s] | 131 | 116 | 120 | 119 | 114 |

TABLE 1-continued

|  |  | Comparative Example 1 LC-A | Example 1 LC-1 | Example 2 LC-2 | Example 3 LC-3 | Example 4 LC-4 |
|---|---|---|---|---|---|---|
| $K_{33}$ [pN] |  | 16.2 | 14.8 | 15.0 | 15.4 | 15.9 |
| $\gamma_1/K_{33}$ |  | 8.1 | 7.6 | 8.0 | 7.7 | 7.2 |
| VHR/% | Initial | 97.5 | 97.4 | 97.4 | 97.6 | 97.4 |
|  | After UV Radiation of 60 J | 89.8 | 93.9 | 93.7 | 93.5 | 93.0 |

TABLE 2

|  | Example 5 LC-5 | Example 6 LC-6 | Example 7 LC-7 | Example 8 LC-8 |
|---|---|---|---|---|
| 1V-Cy-1O—Ph5—O2 | 16 | 14 | 8 | 8 |
| 1V-Cy-1O—Ph5—O3 |  |  |  |  |
| V-Cy-Cy-1O—Ph5—O2 |  |  | 10 | 10 |
| 1V-Cy-Cy-1O—Ph5—O2 | 16 | 16 | 10 | 10 |
| 1V-Cy-Cy-1O—Ph5—O3 |  |  |  |  |
| 3-Cy-Cy-2 | 20 | 29 | 18 | 19 |
| 3-Cy-Cy-4 | 8 | 8 | 9 | 8 |
| 3-Cy-Cy-5 |  |  |  | 5 |
| 3-Cy-Cy-O2 | 4 |  |  |  |
| 3-Cy-Ph—O1 |  |  |  |  |
| 2-Cy-Cy-V1 |  |  |  |  |
| 3-Cy-Cy-V1 |  |  |  |  |
| 3-Cy-1O—Ph5—O1 |  |  |  |  |
| 3-Cy-1O—Ph5—O2 |  |  | 3 | 3 |
| 3-Cy-Cy-1O—Ph5—O2 |  |  | 12.5 |  |
| 2-Cy-Ph—Ph5—O2 |  |  |  | 6 |
| 3-Cy-Ph—Ph5—O2 | 11 | 16.5 |  |  |
| 3-Cy-Ph—Ph5—O3 |  |  |  |  |
| 3-Cy-Ph—Ph5—O4 |  |  |  | 8 |
| 4-Cy-Ph—Ph5—O3 |  |  |  | 4 |
| 3-Ph—Ph-1 | 11 | 9.5 | 10 | 10 |
| 5-Ph—Ph-1 |  |  | 7 | 4 |
| 3-Cy-Cy-Ph-1 |  |  |  |  |
| 3-Cy-Ph—Ph-2 |  |  | 5.5 | 3 |
| 5-Cy-Ph—Ph-2 |  |  | 5 |  |
| V-Cy-Cy-Ph-1 | 10 |  |  |  |
| V-Cy-Ph—Ph-3 |  |  |  |  |
| 1V-Cy-Ph—Ph-3 |  | 4 |  |  |
| 3-Np—Ph5—Ph-2 | 4 | 3 | 2 | 2 |
| Total | 100 | 100 | 100 | 100 |
| Tni [° C.] | 74 | 76 | 76 | 75 |
| Tcn [° C.] | −24 | −10 | −24 | −24 |
| Δn | 0.108 | 0.108 | 0.108 | 0.109 |
| Δε | −3.0 | −3.1 | −3.1 | −3.1 |
| $\gamma_1$ [mPa · s] | 112 | 111 | 120 | 116 |
| $K_{33}$ [pN] | 16.1 | 15.8 | 15.0 | 13.7 |
| $\gamma_1/K_{33}$ | 7.0 | 7.0 | 8.0 | 8.5 |

TABLE 2-continued

|  |  | Example 5 LC-5 | Example 6 LC-6 | Example 7 LC-7 | Example 8 LC-8 |
|---|---|---|---|---|---|
| VHR/% | Initial | 97.5 | 97.3 | 97.5 | 97.6 |
|  | After UV Radiation of 60 J | 93.4 | 94.2 | 93.9 | 93.7 |

The liquid crystal compositions LC-1, LC-2, LC-3, LC-4, LC-5, LC-6, LC-7, and LC-8 of the present invention each had a small rotational viscosity ($\gamma_1$) and large elastic constant ($K_{33}$); in addition, they had $\gamma_1/K_{33}$ which were equivalent to or smaller than that of the liquid crystal composition LC-A of Comparative Example.

Test cells using such liquid crystal compositions were subjected to measurement of a VHR, and the measurement showed that the VHR after the UV radiation was obviously larger in the LC-1, LC-2, LC-3, LC-4, LC-5, LC-6, LC-7, and LC-8 than in the LC-A of Comparative Example 1. Accordingly, each of the liquid crystal compositions of the present invention had a sufficiently small viscosity ($\eta$), sufficiently small rotational viscosity ($\gamma1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Comparative Example 2 and Examples 9 to 19

Polymerizable compounds (M1-1), (M1-3), (M4-7), and (I-33) were added to the liquid crystal compositions LC-A, LC-1, LC-2, LC-3, LC-4, LC-5, LC-6, LC-7, and LC-8 to prepare liquid crystal compositions MLC-A (Comparative Example 2), MLC-1 (Example 9), MLC-2 (Example 10), MLC-3 (Example 11), MLC-4 (Example 12), MLC-5 (Example 13), MLC-6-1 (Example 14), MLC-6-2 (Example 15), MLC-6-3 (Example 16), MLC-6-4 (Example 17), MLC-7 (Example 18), and MLC-8 (Example 19).

[Chem. 42]

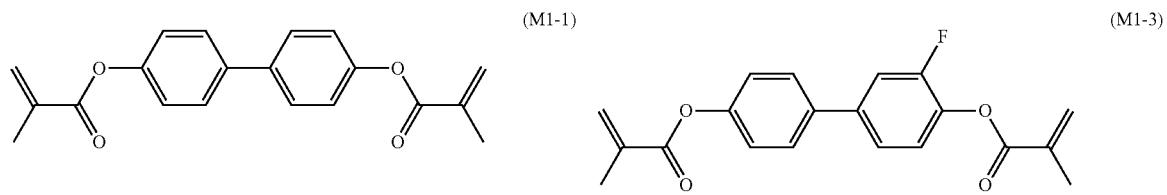

-continued

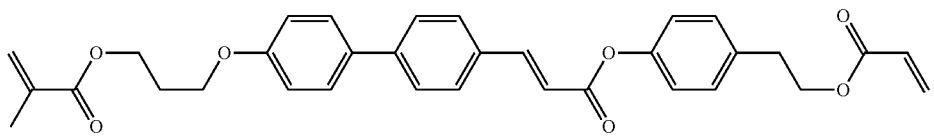
(M4-7)

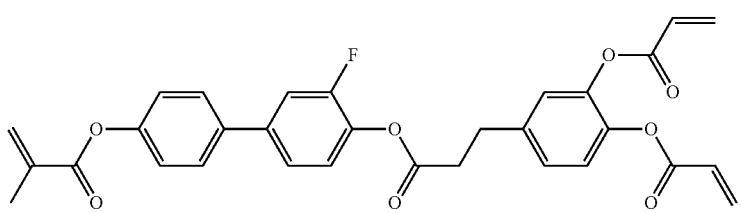
(I-33)

The prepared liquid crystal compositions were vacuum-injected into test cells, and the test cells were subjected to measurement of VHRs before and after UV radiation. Tables 3 and 4 show the constitution and measured VHRs of the liquid crystal compositions.

TABLE 3

| | | Comparative Example 2 MLC-A | Example 9 MLC-1 | Example 10 MLC-2 | Example 11 MLC-3 | Example 12 MLC-4 | Example 13 MLC-5 |
|---|---|---|---|---|---|---|---|
| LC-A | | 99.7 | | | | | |
| LC-1 | | | 99.7 | | | | |
| LC-2 | | | | 99.7 | | | |
| LC-3 | | | | | 99.7 | | |
| LC-4 | | | | | | 99.7 | |
| LC-5 | | | | | | | 99.7 |
| LC-6 | | | | | | | |
| LC-7 | | | | | | | |
| LC-8 | | | | | | | |
| Polymerizable Compound | Formula (M1-3) | | | | | | |
| Polymerizable Compound | Formula (M4-7) | | | | | | |
| Polymerizable Compound | Formula (I-33) | 0.3 | 0.3 | 0.3 | 0.3 | 0.3 | 0.3 |
| Total | | 100 | 100 | 100 | 100 | 100 | 100 |
| VHR/% | Initial | 97.5 | 97.4 | 97.3 | 97.4 | 97.6 | 97.4 |
| | After UV Radiation of 60 J | 94.3 | 96.8 | 96.6 | 96.3 | 96.5 | 96.4 |

TABLE 4

| | | Example 14 MLC-6-1 | Example 15 MLC-6-2 | Example 16 MLC-6-3 | Example 17 MLC-6-4 | Example 18 MLC-7 | Example 19 MLC-8 |
|---|---|---|---|---|---|---|---|
| LC-A | | | | | | | |
| LC-1 | | | | | | | |
| LC-2 | | | | | | | |
| LC-3 | | | | | | | |
| LC-4 | | | | | | | |
| LC-5 | | | | | | | |
| LC-6 | | 99.7 | 99.7 | 99.7 | 99.7 | | |
| LC-7 | | | | | | 99.7 | |
| LC-8 | | | | | | | 99.7 |
| Polymerizable Compound | Formula (M1-3) | | 0.3 | 0.15 | 0.2 | | |

TABLE 4-continued

|  |  | Example 14 MLC-6-1 | Example 15 MLC-6-2 | Example 16 MLC-6-3 | Example 17 MLC-6-4 | Example 18 MLC-7 | Example 19 MLC-8 |
|---|---|---|---|---|---|---|---|
| Polymerizable Compound | Formula (M4-7) |  |  |  | 0.1 |  |  |
| Polymerizable Compound | Formula (I-33) | 0.3 |  | 0.15 |  | 0.3 | 0.3 |
| Total |  | 100 | 100 | 100 | 100 | 100 | 100 |
| VHR/% | Initial | 97.5 | 97.5 | 97.5 | 97.5 | 97.6 | 97.5 |
|  | After UV Radiation of 60 J | 96.6 | 96.4 | 96.7 | 96.7 | 96.4 | 96.5 |

The VHR after the UV radiation was obviously larger in the liquid crystal compositions MLC-1 to 5, MLC-6-1 to 4, MLC-7, and MLC-8 of the present invention than in the liquid crystal composition MLC-A of Comparative Example 2. Accordingly, each of the liquid crystal compositions of the present invention had a sufficiently small viscosity ($\eta$), sufficiently small rotational viscosity ($\gamma_1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Comparative Example 3 and Examples 20 and 21

Liquid crystal compositions LC-B (Comparative Example 3), LC-9 (Example 20), and LC-10 (Example 21) were prepared, and the physical properties thereof were measured. Table 5 shows the constitution and measured physical properties of the liquid crystal compositions.

TABLE 5

|  | Comparative Example 3 LC-B | Example 20 LC-9 | Example 21 LC-10 |
|---|---|---|---|
| 1V-Cy-1O—Ph5—O2 |  |  | 5 |
| 1V-Cy-Cy-1O—Ph5—O2 |  |  | 5 |
| 1V-Cy-Ph5—O2 |  |  |  |
| 1V-Cy-Cy-Ph5—O2 |  | 5 |  |
| 1V-Cy-Ph—Ph5—O2 |  | 7 |  |
| 3-Cy-Cy-2 | 24 | 24 | 24 |
| 3-Cy-Cy-4 | 10 | 10 | 10 |
| 3-Cy-Cy-5 |  |  | 2 |
| 3-Cy-Ph—O1 | 7 | 7 | 7 |
| 3-Cy-Cy-V |  |  |  |
| 3-Cy-Cy-V1 |  |  |  |
| 3-Cy-Ph5—O2 | 13 | 13 | 8 |
| 5-Cy-Ph5—O2 |  |  | 2 |
| 3-Cy-Cy-Ph5—O2 |  |  |  |
| 4-Cy-Cy-Ph5—O2 | 9 | 9 | 9 |
| 5-Cy-Cy-Ph5—O2 | 5 |  |  |
| 2-Cy-Ph—Ph5—O2 | 8.5 | 3 | 6.5 |
| 3-Cy-Ph—Ph5—O2 | 8.5 | 5 | 8.5 |
| 3-Ph—Ph5—Ph-2 | 7 | 7 | 7 |
| 4-Ph—Ph5—Ph-2 | 8 | 8 | 8 |
| 3-Ph—Ph—Ph1—Ph7 |  |  |  |
| Total | 100 | 100 | 100 |
| Tni [° C.] | 76 | 75 | 76 |
| Tcn [° C.] | −28 | −25 | 26 |
| $\Delta n$ | 0.108 | 0.108 | 0.108 |
| $\Delta\varepsilon$ | −2.8 | −2.8 | −2.8 |
| $\gamma_1$ [mPa·s] | 112 | 113 | 114 |
| $K_{33}$ [pN] | 13.7 | 14.7 | 14.8 |

TABLE 5-continued

|  |  | Comparative Example 3 LC-B | Example 20 LC-9 | Example 21 LC-10 |
|---|---|---|---|---|
| $\gamma_1/K_{33}$ |  | 8.2 | 7.7 | 7.7 |
| VHR/% | Initial | 98.3 | 98.5 | 98.6 |
|  | After UV Radiation of 60 J | 95.7 | 95.4 | 95.5 |

The liquid crystal compositions LC-9 and LC-10 of the present invention each had a small rotational viscosity ($\gamma_1$) and large elastic constant ($K_{33}$); in addition, they had $\gamma_1/K_{33}$ that was clearly smaller than that of the liquid crystal composition LC-B of Comparative Example. Test cells using such liquid crystal compositions were subjected to measurement of a VHR, and the measurement showed that the VHRs of the LC-9 and LC-10 after UV radiation were equivalent to that of the LC-B of Comparative Example. Accordingly, each of the liquid crystal compositions of the present invention had a sufficiently small viscosity ($\eta$), sufficiently small rotational viscosity ($\gamma_1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Comparative Example 4 and Examples 22 and 23

Liquid crystal compositions LC-C (Comparative Example 4), LC-11 (Example 22), and LC-12 (Example 23) were prepared, and the physical properties thereof were measured. Table 6 shows the constitution and measured physical properties of the liquid crystal compositions.

TABLE 6

|  | Comparative Example 4 LC-C | Example 22 LC-11 | Example 23 LC-12 |
|---|---|---|---|
| 1V-Cy-1O—Ph5—O2 |  |  | 5 |
| 1V-Cy-Cy-1O—Ph5—O2 |  |  | 5 |
| 1V-Cy-Ph5—O2 |  | 5 |  |
| 1V-Cy-Cy-Ph5—O2 |  | 5 |  |
| 1V-Cy-Ph—Ph5—O2 |  |  |  |
| 3-Cy-Cy-2 |  | 24 | 24 |
| 3-Cy-Cy-4 |  | 10 | 10 |
| 3-Cy-Cy-5 |  | 5 | 5 |
| 3-Cy-Ph—O1 |  | 5 | 6 |
| 3-Cy-Cy-V | 32 |  |  |

TABLE 6-continued

|  |  | Comparative Example 4 LC-C | Example 22 LC-11 | Example 23 LC-12 |
|---|---|---|---|---|
| 3-Cy-Cy-V1 |  | 11 |  |  |
| 3-Cy-Ph5—O2 |  | 13 | 8 | 8 |
| 5-Cy-Ph5—O2 |  | 6 | 6 | 6 |
| 3-Cy-Cy-Ph5—O2 |  | 10 | 5 | 5 |
| 4-Cy-Cy-Ph5—O2 |  |  |  |  |
| 5-Cy-Cy-Ph5—O2 |  |  |  |  |
| 2-Cy-Ph—Ph5—O2 |  | 5 | 4 | 3 |
| 3-Cy-Ph—Ph5—O2 |  | 10 | 10 | 10 |
| 3-Ph—Ph5-Ph-2 |  | 12.5 | 12.5 | 12.5 |
| 4-Ph—Ph5-Ph-2 |  |  |  |  |
| 3-Ph—Ph—Ph1—Ph7 |  | 0.5 | 0.5 | 0.5 |
| Total |  | 100 | 100 | 100 |
| Tni [° C.] |  | 76 | 76 | 75 |
| Tcn [° C.] |  | −25 | −29 | −28 |
| Δn |  | 0.108 | 0.108 | 0.109 |
| Δε |  | −2.7 | −2.8 | −2.8 |
| $\gamma_1$ [mPa·s] |  | 94 | 102 | 101 |
| $K_{33}$ [pN] |  | 14.0 | 15.0 | 15.0 |
| $\gamma_1/K_{33}$ |  | 6.7 | 6.8 | 6.7 |
| VHR/% | Initial | 98.1 | 98.4 | 98.4 |
|  | After UV Radiation of 60 J | 93.8 | 95.3 | 95.2 |

The liquid crystal compositions LC-11 and LC-12 of the present invention each had a small rotational viscosity ($\gamma_1$) and large elastic constant ($K_{33}$); in addition, they had $\gamma_1/K_{33}$ equivalent to that of the liquid crystal composition LC-C of Comparative Example. Test cells using such liquid crystal compositions were subjected to measurement of a VHR, and the measurement showed that the VHRs of LC-11 and LC-12 after UV radiation were clearly larger than that of the LC-C of Comparative Example.

Accordingly, each of the liquid crystal compositions of the present invention had a sufficiently small viscosity (η), sufficiently small rotational viscosity (γ1), a large elastic constant ($K_{33}$), and negative dielectric anisotropy (Δε) with a large absolute value without reductions in refractive index anisotropy (Δn) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Comparative Example 5 and Examples 24 and 25

A polymerizable compound (M1-1) was added to the liquid crystal compositions LC-B, LC-9, and LC-10 to prepare liquid crystal compositions MLC-B (Comparative Example 5), MLC-9 (Example 24), and MLC-10 (Example 25). The liquid crystal compositions were vacuum-injected into test cells, and the test cells were subjected to measurement of VHRs before and after UV radiation. Table 7 shows the constitution and measured VHRs of the liquid crystal compositions.

TABLE 7

|  |  | Comparative Example 5 MLC-B | Example 24 MLC-9 | Example 25 MLC-10 |
|---|---|---|---|---|
| LC-B |  | 99.8 |  |  |
| LC-9 |  |  | 99.8 |  |
| LC-10 |  |  |  | 99.8 |
| Polymerizable Compound | Formula (M1-1) | 0.2 | 0.2 | 0.2 |
| Polymerizable Compound | Formula (M1-3) |  |  |  |
| Polymerizable Compound | Formula (M4-7) |  |  |  |
| Polymerizable Compound | Formula (I-33) |  |  |  |
| Total |  | 100 | 100 | 100 |
| VHR/% | Initial | 98.2 | 98.4 | 98.4 |
|  | After UV Radiation of 60 J | 97.1 | 97.0 | 97.2 |

The liquid crystal compositions MLC-9 and MLC-10 of the present invention each had a small rotational viscosity ($\gamma_1$) and large elastic constant ($K_{33}$); in addition, they had $\gamma_1/K_{33}$ clearly smaller than that of the liquid crystal composition MLC-B of Comparative Example. Test cells using such liquid crystal compositions were subjected to measurement of a VHR, and the measurement showed that the VHRs of MLC-9 and MLC-10 after UV radiation were equivalent to that of the MLC-B of Comparative Example.

Accordingly, each of the liquid crystal compositions of the present invention had a sufficiently small viscosity (η), sufficiently small rotational viscosity (γ1), a large elastic constant ($K_{33}$), and negative dielectric anisotropy (Δε) with a large absolute value without reductions in refractive index anisotropy (Δn) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Comparative Example 6 and Examples 26 and 27

A polymerizable compound (M1-1) was added to the liquid crystal compositions LC-C, LC-11, and LC-12 to prepare liquid crystal compositions MLC-C(Comparative Example 6), MLC-11 (Example 26), and MLC-12 (Example 27). The liquid crystal compositions were vacuum-injected into test cells, and the test cells were subjected to measurement of VHRs before and after UV radiation. Table 8 shows the constitution and measured VHRs of the liquid crystal compositions.

TABLE 8

|  |  | Comparative Example 6 MLC-C | Example 26 MLC-11 | Example 27 MLC-12 |
|---|---|---|---|---|
| LC-C |  | 99.65 |  |  |
| LC-11 |  |  | 99.65 |  |
| LC-12 |  |  |  | 99.65 |
| Polymerizable Compound | Formula (M1-1) | 0.35 | 0.35 | 0.35 |
| Polymerizable Compound | Formula (M1-3) |  |  |  |
| Polymerizable Compound | Formula (M4-7) |  |  |  |
| Polymerizable Compound | Formula |  |  |  |

TABLE 8-continued

|  |  | Comparative Example 6 MLC-C | Example 26 MLC-11 | Example 27 MLC-12 |
|---|---|---|---|---|
| Compound | (I-33) |  |  |  |
| Total |  | 100 | 100 | 100 |
| VHR/% | Initial | 98.0 | 98.3 | 98.2 |
|  | After UV Radiation of 60 J | 95.9 | 97.3 | 97.0 |

Test cells using such liquid crystal compositions were subjected to measurement of a VHR, and the measurement showed that the VHR after UV radiation was clearly higher in the MLC-11 and MLC-12 than in the MLC-C of Comparative Example.

Accordingly, each of the liquid crystal compositions of the present invention had a sufficiently small viscosity ($\eta$), sufficiently small rotational viscosity ($\gamma1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Examples 28 to 33

Liquid crystal compositions LC-13 (Example 28), LC-14 (Example 29), LC-15 (Example 30), LC-16 (Example 31), LC-17 (Example 32), and LC-18 (Example 33) were prepared, and the physical properties thereof were measured. Table 9 shows the constitution and measured physical properties of the liquid crystal compositions.

TABLE 9

|  |  | Example 28 LC-13 | Example 29 LC-14 | Example 30 LC-15 | Example 31 LC-16 | Example 32 LC-17 | Example 33 LC-18 |
|---|---|---|---|---|---|---|---|
| 1V-Cy-1O—Ph5—O2 |  | 5 | 5 | 5 | 5 | 5 | 5 |
| 1V-Cy-1O—Ph5—O4 |  | 5 | 5 |  |  |  |  |
| V-Cy-Cy-1O—Ph5—O2 |  |  |  |  |  |  | 13 |
| 1V-Cy-Cy-1O—Ph5—O1 |  |  |  | 5 | 5 | 5 |  |
| 1V-Cy-Cy-1O—Ph5—O2 |  | 9 | 9 | 9 | 9 | 9 | 9 |
| 1V-Cy-Cy-1O—Ph5—O3 |  | 8 |  |  |  |  |  |
| 3-Cy-Cy-2 |  | 20 | 20 | 18 | 20.5 | 18.5 | 20 |
| 3-Cy-Cy-4 |  | 8 | 8 | 6.5 | 8 | 8 | 8 |
| 3-Cy-Cy-5 |  | 5 | 5 | 5 | 5 | 5 | 2 |
| 3-Cy-Ph—O1 |  | 4 | 4 | 4 | 4 | 4 | 4 |
| 3-Cy-1O—Ph5—O2 |  | 4 |  | 7.5 | 9.5 | 8 | 5 |
| 2-Cy-Cy-1O—Ph5—O2 |  |  |  |  |  |  |  |
| 3-Cy-Cy-1O—Ph5—O2 |  |  |  | 5 | 5 | 4 |  |
| 3-Cy-Cy-Ph5—O2 |  |  | 9.5 |  |  |  |  |
| 2-Cy-Ph—Ph5—O2 |  | 7 | 5 |  |  |  | 7 |
| 3-Cy-Ph—Ph5—O2 |  | 8 | 10 | 8 | 8 | 8 | 8 |
| 3-Cy-Ph—Ph5—O3 |  |  |  | 7 |  | 7 |  |
| 3-Cy-Ph—Ph5—O4 |  |  | 5 |  |  |  |  |
| 3-Ph—Ph-1 |  | 9 | 12.5 | 12.5 | 6 | 11.5 | 12 |
| 3-Cy-Ph—Ph-2 |  |  | 2.5 |  |  |  | 2 |
| 1V-Cy-Ph—Ph-3 |  | 5 |  | 5 | 5 | 5 | 5 |
| 3-Ph—Ph5—Ph-2 |  |  |  |  | 10 |  |  |
| 1V2—Ph—Ph5—Ph—2V1 |  |  |  |  |  | 2 |  |
| 3-Np—Ph5—Ph-2 |  | 3 | 2 |  |  |  |  |
| Total |  | 100 | 100 | 100 | 100 | 100 | 100 |
| Tni [° C.] |  | 76 | 76 | 76 | 75 | 76 | 75 |
| Tcn [° C.] |  | −27 | −24 | −26 | −28 | −30 | −22 |
| $\Delta n$ |  | 0.109 | 0.109 | 0.109 | 0.108 | 0.108 | 0.108 |
| $\Delta\varepsilon$ |  | −3.0 | −2.8 | −3.0 | −3.0 | −3.0 | −3.1 |
| $\gamma_1$ [mPa · s] |  | 119 | 112 | 117 | 119 | 119 | 110 |
| $K_{33}$ [pN] |  | 15.2 | 14.4 | 15.4 | 15.2 | 15.7 | 14.5 |
| $\gamma_1/K_{33}$ |  | 7.8 | 7.8 | 7.6 | 7.8 | 7.6 | 7.6 |
| VHR/% | Initial | 97.6 | 97.8 | 97.5 | 97.7 | 97.7 | 97.6 |
|  | After UV Radiation of 60 J | 94.2 | 94.3 | 95.0 | 94.5 | 94.4 | 94.2 |

The liquid crystal compositions LC-13 to LC-18 of the present invention each had a small rotational viscosity ($\gamma_1$), large elastic constant ($K_{33}$), and sufficiently small $\gamma_1/K_{33}$. Test cells using such liquid crystal compositions were subjected to measurement of a VHR, and the measurement showed that the VHRs of LC-13 to LC-18 after UV radiation were clearly high.

Accordingly, each of the liquid crystal compositions of the present invention had a sufficiently small viscosity ($\eta$), sufficiently small rotational viscosity ($\gamma1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

Examples 34 to 39

A Polymerizable compound (1-33) was added to the liquid crystal compositions LC-13 to LC-18 to prepare liquid crystal compositions MLC-13 (Example 34), MLC-14 (Example 35), MLC-15 (Example 36), MLC-16 (Example 37), MLC-17 (Example 38), and MLC-18 (Example 39). The liquid crystal compositions were vacuum-injected into test cells, and the test cells were subjected to measurement of VHRs before and after UV radiation. Table 10 shows the constitution and measured VHRs of the liquid crystal compositions.

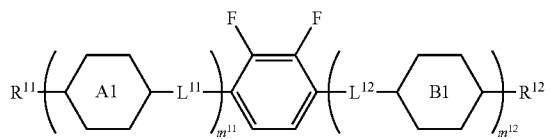

(I-a)

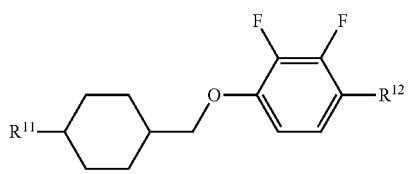

(I-A1)

TABLE 10

|  |  | Example 34 MLC-13 | Example 35 MLC-14 | Example 36 MLC-15 | Example 37 MLC-16 | Example 38 MLC-17 | Example 39 MLC-18 |
|---|---|---|---|---|---|---|---|
| LC-13 |  | 99.7 |  |  |  |  |  |
| LC-14 |  |  | 99.7 |  |  |  |  |
| LC-15 |  |  |  | 99.7 |  |  |  |
| LC-16 |  |  |  |  | 99.7 |  |  |
| LC-17 |  |  |  |  |  | 99.7 |  |
| LC-18 |  |  |  |  |  |  | 99.7 |
| Polymerizable Compound | Formula (M1-3) |  |  |  |  |  |  |
| Polymerizable Compound | Formula (M4-7) |  |  |  |  |  |  |
| Polymerizable Compound | Formula (I-33) | 0.3 | 0.3 | 0.3 | 0.3 | 0.3 | 0.3 |
| Total |  | 100 | 100 | 100 | 100 | 100 | 100 |
| VHR/% | Initial | 97.6 | 97.7 | 97.4 | 97.7 | 97.6 | 97.7 |
|  | After UV Radiation of 60 J | 96.5 | 96.8 | 96.6 | 96.5 | 96.7 | 96.5 |

Test cells using such liquid crystal compositions were subjected to measurement of a VHR, and the measurement showed that the VHR after UV radiation was clearly high in the MLC-13 to 18.

Accordingly, each of the liquid crystal compositions of the present invention had a sufficiently small viscosity ($\eta$), sufficiently small rotational viscosity ($\gamma1$), a large elastic constant ($K_{33}$), and negative dielectric anisotropy ($\Delta\varepsilon$) with a large absolute value without reductions in refractive index anisotropy ($\Delta n$) and nematic phase-isotropic liquid phase transition temperature ($T_{ni}$); hence, a liquid crystal display device of, for instance, a VA type in which such a liquid crystal composition was used had an excellent display quality, high UV resistance, and high reliability.

The invention claimed is:

1. A liquid crystal composition comprising;
   a first component represented by General Formula (I-a), wherein the liquid crystal composition includes at least one compound selected from the group consisting of the compounds represented by Formulae (I-A1) to (I-A6) as the first component, -continued

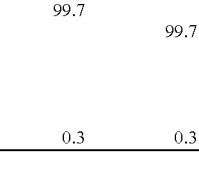

(I-A2)

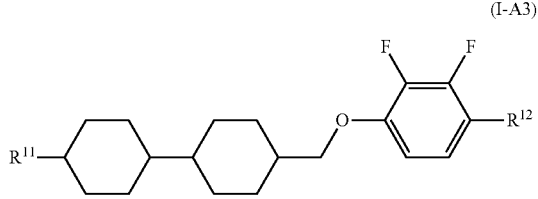

(I-A3)

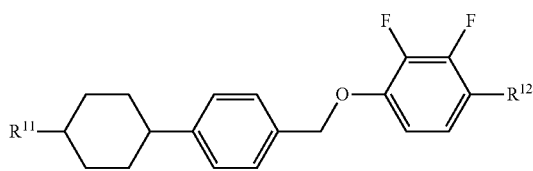

(I-A4)

-continued (I-A5)
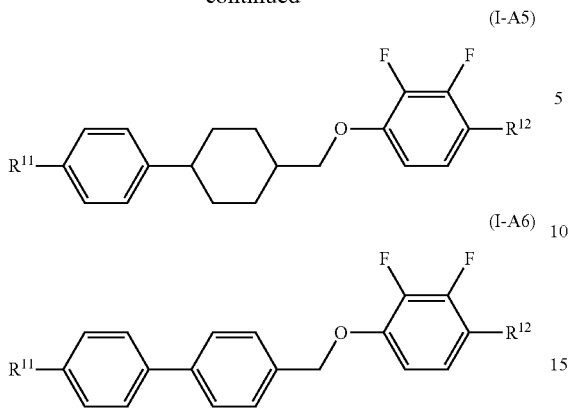

(I-A6)

where R$^{11}$ represents an alkenyl group having 2 to 8 carbon atoms; R$^{12}$ represents an alkyl group having 1 to 8 carbon atoms, an alkoxy group having 1 to 8 carbon atoms, or an alkenyl group having 2 to 8 carbon atoms L$^{11}$ and L$^{12}$ each represent —OCH$_2$—, —CH$_2$O—, —CF$_2$O—, —OCF$_2$—, —CH$_2$CH$_2$—, —CF$_2$CF$_2$—, or a single bond; in the case where L$^{11}$ and L$^{12}$ are multiple, the multiple L$^{11}$'s may be the same as or different from each other, and the multiple L$^{12}$'s may be the same as or different from each other;

m$^{11}$ and m$^{12}$ each independently represent 0, 1, or 2; m$^{11}$+m$^{12}$ is 1, 2, or 3;

the rings A1 and B1 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; in the case where the rings A1 and/or B1 are multiple, the multiple rings A1 may be the same as or different from each other, and the multiple rings B1 may be the same as or different from each other; the rings A1 and B1 are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group; and at least one of R$^{11}$ and R$^{12}$ represents an alkenyl group having 2 to 8 carbon atoms; and a second component selected from the group consisting of compounds represented by Formulae (I-D1) to (I-D3);

(I-D1)

(I-D2)

(I-D3)

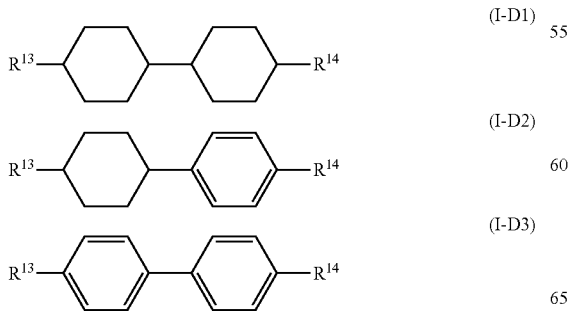

where R$^{13}$ and R$^{14}$ each represent an alkyl group having 1 to 8 carbon atoms, an alkoxy group having 1 to 5 carbon atoms, or an alkenyl group having 2 to 8 carbon atoms, wherein the amount of a compound as the second component in which each of R$^{13}$ and R$^{14}$ is not an alkenyl group having 2 to 8 carbon atoms is in the range of 90 to 100 mass %, a third component that is at least one compound represented by General Formula (I-c)

(I-c)
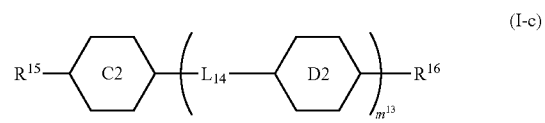

where R$^{15}$ and R$^{16}$ each represent an alkyl group having 1 to 8 carbon atoms or an alkenyl group having 2 to 8 carbon atoms; in each of the alkyl and alkenyl groups, —CH$_2$— or at least two —CH$_2$-'s not adjoining each other are each independently optionally substituted with —O— or —S—, and one or more hydrogen atoms are each independently optionally substituted with a fluorine atom or a chlorine atom;

L$^{14}$ represents —OCH$_2$—, —CH$_2$O—, —CF$_2$O—, —OCF$_2$—, —CH$_2$CH$_2$—, —CF$_2$CF$_2$—, or a single bond;

the rings C2 and D2 each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group; the rings C2 and D2 are each independently optionally substituted with an alkyl group having 1 to 12 carbon atoms, a halogenated alkyl group having 1 to 12 carbon atoms, an alkoxy group having 1 to 12 carbon atoms, a halogenated alkoxy group having 1 to 12 carbon atoms, a halogen, a cyano group, or a nitro group; the multiple rings D2 may be the same as or different from each other; and m$^{13}$ represents 2 or 3, wherein a total amount of the first component, the second component and the third component is 95% to 100%.

2. The liquid crystal composition according to claim 1, wherein the liquid crystal composition includes at least one compound represented by General Formula (V) as the first component of the liquid crystal composition, in addition to said at least one compound selected from the group consisting of the compounds represented by Formulae (I-A1) to (I-A6), (V)
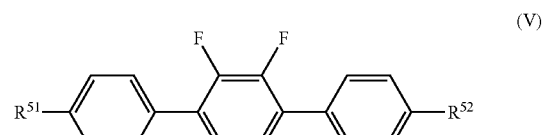

where R$^{51}$ and R$^{52}$ each independently have the same meaning as R$^{11}$ and R$^{12}$ in Formula (I-a).

3. The liquid crystal composition according to claim 1, wherein at least one compound selected from the group consisting of compounds represented by General Formulae (Np-1) and (Np-2) is used as the compound represented by General Formula (I-c)

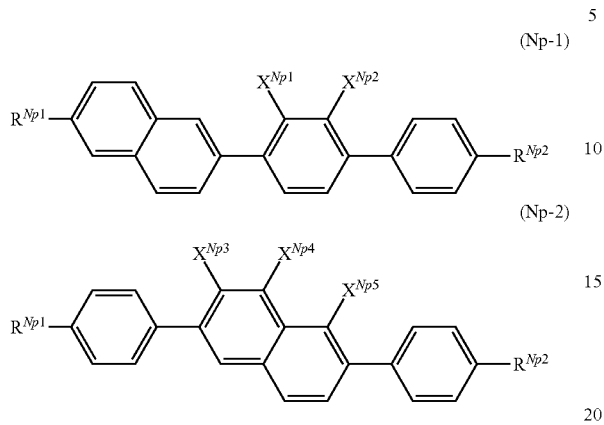

where $R^{Np1}$ and $R^{Np2}$ each independently represent an alkyl group having 1 to 5 carbon atoms or an alkenyl group having 2 to 5 carbon atoms; in each of the alkyl and alkenyl groups, one —CH$_2$— or at least two —CH$_2$—'s not adjoining each other are each independently optionally substituted with —O— or —S—, and one or more hydrogen atoms are each independently optionally substituted with a fluorine atom; and $X^{Np1}$, $X^{Np2}$, $X^{Np3}$, $X^{Np4}$, and $X^{Np5}$ each independently represent a hydrogen atom or a fluorine atom.

4. The liquid crystal composition according to claim 1, wherein dielectric anisotropy (Δε) at 20° C. is in the range of −2.0 to −8.0, refractive index anisotropy (Δn) at 20° C. is in the range of 0.08 to 0.14, viscosity (η) at 20° C. is in the range of 5 to 30 mPa·S, rotational viscosity (γ1) at 20° C. is in the range of 50 to 150 mPa·S, and nematic phase-isotropic liquid phase transition temperature ($T_{ni}$) is in the range of 60° C. to 120° C.

5. The liquid crystal composition according to claim 1, further comprising at least one polymerizable compound.

6. The liquid crystal composition according to claim 5, wherein the polymerizable compound is a compound represented by General Formula (RM-1)

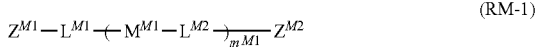

where $Z^{M1}$ and $Z^{M2}$ each independently represent the following structure;

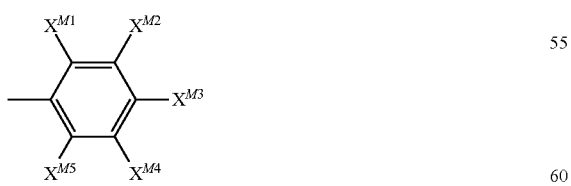

$X^{M1}$ to $X^{M5}$ each represent a hydrogen atom, a fluorine atom, or the following structure;

—$S^{M1}$—$R^{M1}$ at least one of $X^{M1}$ to $X^{M5}$ is the following structure;

—$S^{M1}$—$R^{M1}$ $S^{M1}$ represents an alkylene group having 1 to 12 carbon atoms or a single bond, and —CH$_2$— of the alkylene group is optionally substituted with an oxygen atom, —COO—, —OCO—, or —OCOO— provided that oxygen atoms are not directly bonded to each other;

$R^{M1}$ represents any of the following structures represented by Formulae (R-1) to (R-15);

(R14)

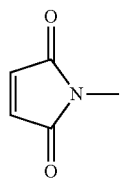

(R-15)

HS—

L$^{M1}$ and L$^{M2}$ each independently represent a single bond, —O—, —CH$_2$—, —OCH$_2$—, —CH$_2$O—, —CO—, —C$_2$H$_4$—, —COO—, —OCO—, —CH=CH—COO—, —COO—CH=CH—, —OCO—CH=CH—, —CH=CH—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF=CF—, —CF$_2$—, —CF$_2$O—, —OCF$_2$—, —CF$_2$CH$_2$—, —CH$_2$CF$_2$—, —CF$_2$CF$_2$—, or —C≡C—; in the case where L$^{M2}$ is multiple, the multiple L$^{M2}$'s may be the same as or different from each other;

M$^{M1}$ represents a 1,4-phenylene group, a 1,4-cyclohexylene group, or a naphthalene-2,6-diyl group and is optionally subjected to substitution of a hydrogen atom in its structure with a fluorine atom, a chlorine atom, an alkyl group having 1 to 8 carbon atoms, a halogenated alkyl group having 1 to 8 carbon atoms, a halogenated alkoxy group having 1 to 8 carbon atoms, an alkoxy group having 1 to 8 carbon atoms, a nitro group, or the following structure;

—S$^{M1}$—R$^{M1}$ m$^{M1}$ represents 0, 1, or 2; and in the case where X$^{M1}$ to X$^{M5}$, S$^{M1}$, R$^{M1}$, L$^{M2}$ and/or M$^{M1}$ are multiple, corresponding ones of them may be the same as or different from each other.

7. A liquid crystal display device comprising the liquid crystal composition according to claim 1.

8. An active-matrix liquid crystal display device comprising the liquid crystal composition according to claim 1.

9. A liquid crystal display device of any of VA, PSA, PSVA, IPS, and ECB modes, the device comprising the liquid crystal composition according to claim 1.

10. The liquid crystal composition according to claim 1, further comprising a compound selected from the group consisting of compounds represented by Formulae (I-B1) to (I-B6), and (I-C1) to (I-C6)

(I-B1)

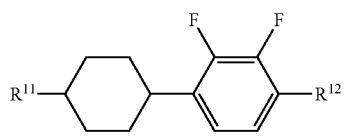

(I-B2)

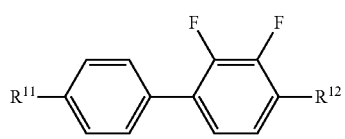

(I-B3)

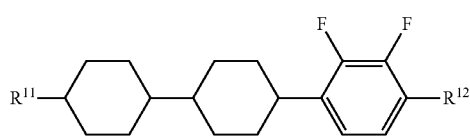

(I-C1)

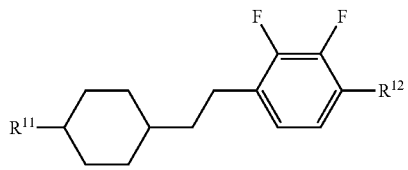

(I-C2)

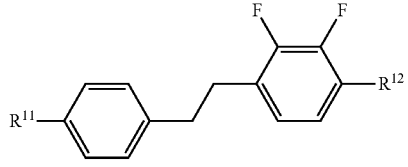

(I-C3)

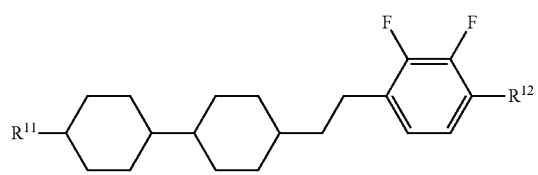

(I-B4)

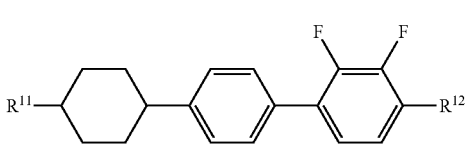

(I-B5)

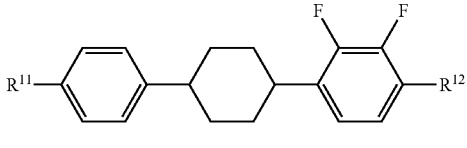

(I-B6)

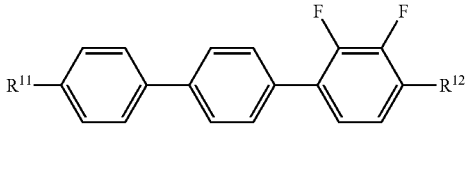

(I-C4)

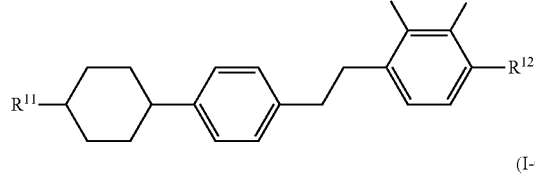

(I-C5)

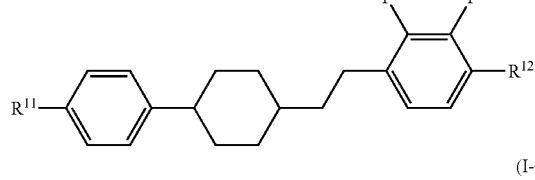

(I-C6)

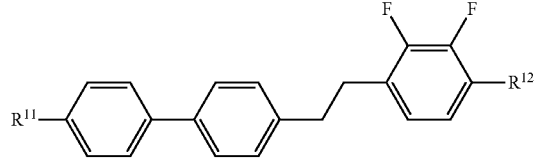

where $R^{11}$ and $R^{12}$ each independently have the same meaning as $R^{11}$ and $R^{12}$ in Formula (I-a).

11. The liquid crystal composition according to claim 1, wherein the compound represented by General Formula (I-c) is a compound selected from the group consisting of compounds represented by Formulae (I-E1) to (I-E9):

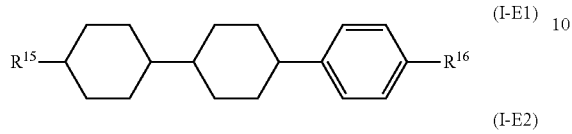
(I-E1)

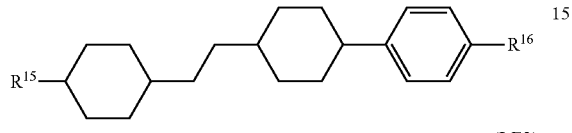
(I-E2)

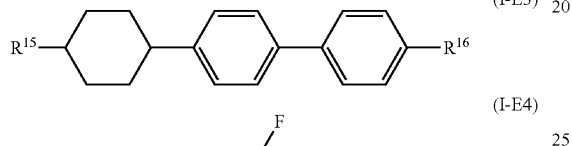
(I-E3)

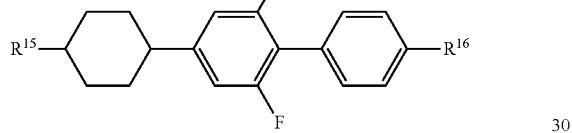
(I-E4)

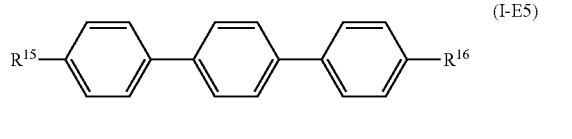
(I-E5)

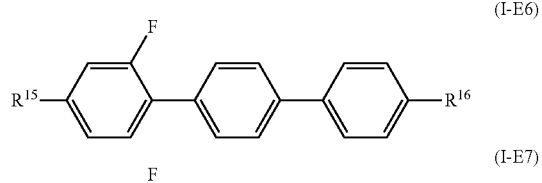
(I-E6)

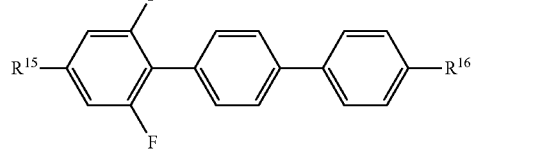
(I-E7)

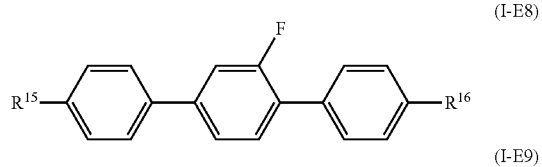
(I-E8)

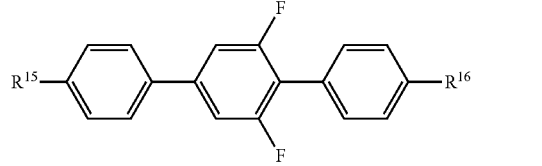
(I-E9)

where $R^{15}$ and $R^{16}$ each independently have the same meaning as $R^{15}$ and $R^{16}$ in Formula (I-c).

12. The liquid crystal composition according to claim 1, wherein the first component is at least one compound selected from the group consisting of the compounds represented by Formulae (I-A1) and (I-A3).

* * * * *